(12) United States Patent
Koyama et al.

(10) Patent No.: US 10,913,871 B2
(45) Date of Patent: Feb. 9, 2021

(54) INK COMPOSITION, METHOD FOR PRODUCING THE SAME, AND IMAGE-FORMING METHOD

(71) Applicant: FUJIFILM CORPORATION, Tokyo (JP)

(72) Inventors: Ichiro Koyama, Kanagawa (JP); Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/584,957

(22) Filed: Sep. 27, 2019

(65) Prior Publication Data

US 2020/0048487 A1 Feb. 13, 2020

Related U.S. Application Data

(63) Continuation of application No. PCT/JP2018/012227, filed on Mar. 26, 2018.

(30) Foreign Application Priority Data

Apr. 3, 2017 (JP) .................................. 2017-074057

(51) Int. Cl.
*C09D 11/38* (2014.01)
*B41M 5/00* (2006.01)
*C09D 11/102* (2014.01)

(52) U.S. Cl.
CPC ............ *C09D 11/38* (2013.01); *B41M 5/0023* (2013.01); *C09D 11/102* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| 2008/0122915 | A1* | 5/2008 | Madaras | C09D 11/36 347/100 |
|---|---|---|---|---|
| 2009/0087788 | A1* | 4/2009 | Kanchiku | B41C 1/1008 430/286.1 |
| 2009/0246479 | A1* | 10/2009 | Mukai | B41M 5/0023 428/195.1 |
| 2010/0075115 | A1* | 3/2010 | Tuerk | C09D 11/322 428/195.1 |
| 2011/0143055 | A1 | 6/2011 | Tuerk et al. | |
| 2014/0092168 | A1* | 4/2014 | Ito | B41J 2/16552 347/21 |
| 2015/0064423 | A1 | 3/2015 | Ohmoto | |
| 2015/0184010 | A1 | 7/2015 | Okada et al. | |
| 2015/0203697 | A1 | 7/2015 | Brandstein et al. | |
| 2016/0200938 | A1 | 7/2016 | Berger et al. | |

FOREIGN PATENT DOCUMENTS

| CN | 106221346 A | 12/2016 |
|---|---|---|
| JP | 2005-213463 A | 8/2005 |
| JP | 2007-197732 A | 8/2007 |
| JP | 2010-518249 A | 5/2010 |
| JP | 2011-530634 A | 12/2011 |
| JP | 2013-018860 A | 1/2013 |
| JP | 2013-193324 A | 9/2013 |
| JP | 2015-048435 A | 3/2015 |
| JP | 2015-124271 A | 7/2015 |
| JP | 2015-174943 A | 10/2015 |
| JP | 2015-529731 A | 10/2015 |
| JP | 2017-008292 A | 1/2017 |
| JP | 2017-119862 A | 7/2017 |

OTHER PUBLICATIONS

International Search Report issued in International Application No. PCT/JP2018/012227 dated Jun. 12, 2018.
Opinion of the ISA issued in International Application No. PCT/JP2018/012227 dated Jun. 12, 2018.
Extended European Search Report dated Mar. 16, 2020, issued in corresponding EP Patent Application No. 18781734.1.
English language translation of the following: Office action dated Dec. 1, 2020 from the JPO in a Japanese patent application No. 2019-511166 corresponding to the instant patent application.

* cited by examiner

*Primary Examiner* — Manish S Shah
(74) *Attorney, Agent, or Firm* — Solaris Intellectual Property Group, PLLC

(57) ABSTRACT

An ink composition including water, particles that include a polymer having at least one of a urethane bond or a urea bond and have a polymerizable group, and a hydrophobic compound that has an alkyl group having 8 or more carbon atoms and has a molecular weight of 5000 or less, a method for producing the ink composition, and an image-forming method.

12 Claims, No Drawings

INK COMPOSITION, METHOD FOR PRODUCING THE SAME, AND IMAGE-FORMING METHOD

CROSS-REFERENCE TO RELATED APPLICATIONS

This application is a continuation application of International Application No. PCT/JP2018/012227, filed Mar. 26, 2018, the disclosure of which is incorporated herein by reference in its entirety. Further, this application claims priority from Japanese Patent Application No. 2017-074057, filed Apr. 3, 2017, the disclosure of which is incorporated herein by reference in its entirety.

BACKGROUND OF THE INVENTION

1. Field of the Invention

The present disclosure relates to an ink composition, a method for producing the ink composition, and an image-forming method.

2. Description of the Related Art

There are known compositions that include a polymer having a urethane structure and water, and have photocurability.

For example, there is a known actinic-energy-ray-curable composition for covering a resin substrate, the composition being capable of providing excellent matte appearances and being less likely to undergo phase separation, the composition including (A) a water-dispersible actinic-energy-ray-curable urethane resin, (B) an actinic-energy-ray-curable compound other than the component (A), (C) an actinic-energy-ray polymerization initiator dispersed in water, and (D) water, wherein, relative to the total amount (100 parts by mass) of the component (A) and the component (B), the component (A) content is 10 parts by mass or more and 100 parts by mass or less, the component (B) content is 0 parts by mass or more and 90 parts by mass or less, the component (C) content is 2 parts by mass or more and 30 parts by mass or less, and the component (D) content is 20 parts by mass or more and 1000 parts by mass or less (for example, refer to JP2015-174943A).

There is also a known composition for forming a film, the composition being capable of forming a lubricant film, on the surface of a substrate of a desired material, having high sliding durability and adhering so firmly to a substrate that it exhibits, in case of deformation of the substrate, high conformability to the deformation, the composition including (A) an actinic-energy-ray-curable resin, and (B) oil-containing fine particles (for example, refer to JP2013-018860A). This JP2013-018860A discloses that the actinic-energy-ray-curable resin (A) may include a compound containing a (meth)acryloyl group and having a urethane bond (refer to Paragraphs 0031 to 0033), and the composition for forming a film may contain water as a solvent (Paragraph 0097).

There is also a known polyurethane resin aqueous dispersion providing a dry film having high heat resistance or high impact resilience, the polyurethane resin aqueous dispersion including a polyurethane resin (A) having, in a molecular side chain, two or more polymerizable unsaturated groups selected from a (meth)acryloyl group, a (meth)allyl group, and a propenyl group, and an aqueous solvent, the aqueous dispersion being obtained by causing a reaction among an organic polyisocyanate (a), a polyol (b), and a compound (c) having two or more hydroxyl groups and two or more polymerizable unsaturated groups selected from a (meth)acryloyl group, a (meth)allyl group, and a propenyl group, dispersing the resultant isocyanate group-terminated prepolymer ($A_0$) in an aqueous solvent, and then further causing a chain extension reaction (for example, refer to JP2005-213463A).

There are also, as known thermosetting aqueous coating compositions including a metal flake pigment providing desired appearance characteristics, an aqueous polyurethane dispersing agent and a thermosetting composition including the aqueous polyurethane dispersing agent, the aqueous polyurethane dispersing agent including an aqueous solvent having dispersed polyurethane-acrylate particles, the particles including a reaction product obtained by polymerization of a hydrophobic polymerizable ethylenically unsaturated monomer, a crosslinkable monomer, and an active hydrogen-containing polyurethane acrylate prepolymer, the prepolymer being a reaction product obtained by causing a reaction among a polyol, a polymerizable ethylenically unsaturated monomer including at least one hydroxyl group, a compound having at least one hydroxyl group and optionally a carboxyl group and including an alkyl group, and a polyisocyanate (for example, refer to JP2007-197732A).

SUMMARY OF THE INVENTION

As described above, JP2015-174943A, JP2013-018860A, JP2005-213463A, and JP2007-197732A disclose compositions that include a polymer having a urethane structure and water, and have photocurability. The compositions described in these literatures can be used to form films having urethane bonds (such as images).

However, images having urethane bonds may have image surfaces having higher friction than images not having urethane bonds. For this reason, in some cases, there has been a demand for images having urethane bonds that have image surfaces having lower friction and having higher scratch resistance.

An object of the present disclosure is to provide an ink composition capable of forming an image having higher scratch resistance, a method for producing the ink composition, and an image-forming method using this ink composition.

Specific means for achieving the object includes the following embodiments.

<1> An ink composition including:
water;
particles that include a polymer having at least one of a urethane bond or a urea bond, and have a polymerizable group; and
a hydrophobic compound that has an alkyl group having 8 or more carbon atoms and has a molecular weight of 5000 or less.

<2> The ink composition according to <1>, wherein the hydrophobic compound has the alkyl group that has 16 or more carbon atoms.

<3> The ink composition according to <1> or <2>, wherein a content of the hydrophobic compound relative to a total amount of the ink composition is 0.05 mass % or more.

<4> The ink composition according to any one of <1> to <3>, wherein a content of the hydrophobic compound relative to a total amount of the ink composition is 0.10 mass % to 0.50 mass %.

<5> The ink composition according to any one of <1> to <4>, wherein a content of the alkyl group of the hydrophobic compound relative to a total amount of the ink composition is 0.08 mass % to 0.40 mass %.

<6> The ink composition according to any one of <1> to <5>, wherein the hydrophobic compound is included in the particles.

<7> The ink composition according to any one of <1> to <6>, wherein a content of the hydrophobic compound relative to a total solid-content amount of the particles is 0.50 mass % to 2.50 mass %.

<8> The ink composition according to any one of <1> to <7>, wherein a content of the alkyl group of the hydrophobic compound relative to a total solid-content amount of the particles is 0.40 mass % to 2.00 mass %.

<9> The ink composition according to any one of <1> to <8>, wherein the hydrophobic compound has a melting point of more than 25° C.

<10> The ink composition according to any one of <1> to <9>, wherein the alkyl group of the hydrophobic compound is a linear alkyl group.

<11> The ink composition according to any one of <1> to <10>, wherein the hydrophobic compound is an alcohol.

<12> A method for producing the ink composition according to any one of <1> to <11>, the method including mixing and emulsifying (A) an oil-phase component including an organic solvent, the hydrophobic compound, the polymer, and a polymerizable compound, or an oil-phase component including an organic solvent, the hydrophobic compound, a tri- or higher functional isocyanate compound, and a polymerizable compound, and (B) an aqueous-phase component including water, to form the particles.

<13> An image-forming method including:

applying the ink composition according to any one of <1> to <11> onto a substrate; and curing the ink composition applied onto the substrate.

The present disclosure provides an ink composition capable of forming an image having high scratch resistance, a method for producing the ink composition, and an image-forming method using this ink composition.

DESCRIPTION OF THE PREFERRED EMBODIMENTS

In this Specification, ranges defined by a value "to" a value include these values as the minimum value and the maximum value.

In this Specification, the amount of each of components in a composition means, when the composition contains a plurality of substances belonging to such a component, the total amount of the plurality of substances in the composition unless otherwise specified.

In this Specification, the term "step" includes not only an independent step, but also a step that is not clearly distinguished from another step but that achieves the intended result of the step.

In this Specification, "*" in chemical formulas denote bonding positions.

In this Specification, "images" mean any films formed from ink. The concept of "images" encompasses, in addition to patterned images (such as characters, symbols, and figures), solid images.

In this Specification, "light" is a concept that encompasses actinic energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Ink Composition

The ink composition according to the present disclosure (hereafter, also simply referred to as "ink") includes water, particles that include a polymer having at least one of a urethane bond or a urea bond (hereafter, also referred to as "specified polymer") and have a polymerizable group (hereafter, also referred to as "specified particles"), and a hydrophobic compound that has an alkyl group having 8 or more carbon atoms and has a molecular weight of 5000 or less (hereafter, also referred to as "specified hydrophobic compound").

The ink according to the present disclosure is capable of forming an image having high scratch resistance.

The mechanism of providing such advantages is inferred as described below; however, the ink according to the present disclosure is not limited to the following mechanism.

Images having a urethane bond and/or a urea bond may have image surfaces having higher friction (namely, surface energy) than images not having a urethane bond and/or a urea bond. Thus, in some cases, there has been a demand for images having a urethane bond and/or a urea bond that have image surfaces having lower friction (namely, surface energy) and higher scratch resistance.

In this regard, in the case of applying the ink according to the present disclosure, the ink being an aqueous composition containing water, onto a substrate, the specified hydrophobic compound is inferentially localized in the surface of the ink applied onto the substrate (namely, a region near the air-liquid interface) due to hydrophobic interaction among alkyl groups having 8 or more carbon atoms. The ink in this state is cured (in other words, polymerized using polymerizable groups), to thereby form an image cured and having a surface in which the specified hydrophobic compound is inferentially localized. The specified hydrophobic compound localized in the surface of the cured image inferentially causes a decrease in the friction (namely, surface energy) of the surface of the image, to thereby provide higher scratch resistance of the image.

Hereinafter, components that can be included in the ink according to the present disclosure will be described.

Specified Hydrophobic Compound

The ink according to the present disclosure contains the specified hydrophobic compound (specifically, a hydrophobic compound that has an alkyl group having 8 or more carbon atoms and has a molecular weight of 5000 or less).

The specified hydrophobic compound may be included in the specified particles, or may not be included in the specified particles. In other words, in the ink of the present disclosure, the specified hydrophobic compound may be present in the specified particles, or may be present outside of the specified particles.

The specified hydrophobic compound contained in the ink of the present disclosure may be one compound alone, or two or more compounds.

The molecular weight of the specified hydrophobic compound is, from the viewpoint of providing an image having higher scratch resistance, preferably 1000 or less, more preferably 500 or less.

The lower limit of the molecular weight of the specified hydrophobic compound is at least the minimum molecular weight of compounds having an alkyl group having 8 or more carbon atoms. The lower limit of the molecular weight of the specified hydrophobic compound is 130, for example.

In the specified hydrophobic compound, "hydrophobic" means a property of having a solubility of less than 5 mass % in water at 25° C.

The solubility in water is measured in the following manner when the test substance (specifically, the test substance that may be determined to be a specified hydrophobic compound) has a melting point of more than 25° C. Specifically, a Erlenmeyer flask is charged with 20 g of the test substance and 80 g of water, and shaken at 25° C. for 24 hours. The resultant solution is filtered through a 5 μm membrane filter, to obtain filtrate. The obtained filtrate (5 g) is evaporated to dryness at 100° C. for 3 hours. From the mass of the residual, the content (mass %) of the test substance dissolved in the filtrate relative to the total amount of the filtrate is calculated. The calculated content (mass %) is defined as the solubility in water of the test substance.

The solubility in water is measured in the following manner when the test substance (specifically, the test substance that may be determined to be a specified hydrophobic compound) has a melting point of 25° C. or less. Specifically, an Erlenmeyer flask is charged with 100 g of water; while the internal temperature is maintained at 25° C., the test substance is gradually dropped. The dropping is ended when visual observation finds cloudiness in the liquid within the Erlenmeyer flask. The mass (mass %) of the test substance dropped until the end of the dropping relative to the total mass of the liquid within the Erlenmeyer flask is defined as the solubility in water of the test substance.

For example, sodium dodecyl sulfate, which can be used as surfactant and is not a hydrophobic compound, is not included in the concept of the specified hydrophobic compound defined herein.

Incidentally, obviously, the ink according to the present disclosure may contain, as a component other than the specified hydrophobic compound, sodium dodecyl sulfate.

As described above, the alkyl group of the specified hydrophobic compound has 8 or more carbon atoms.

From the viewpoint of providing an image having higher scratch resistance, the alkyl group of the specified hydrophobic compound preferably has 16 or more carbon atoms, more preferably 18 or more carbon atoms.

The upper limit of the number of carbon atoms of the alkyl group of the hydrophobic compound is not particularly limited. From the viewpoint of ease of production of the ink, the number of carbon atoms of the alkyl group of the specified hydrophobic compound is preferably 24 or less, particularly preferably 22 or less.

Examples of the specified hydrophobic compound include an alcohol, an ether, and an ester.

Hereinafter, specific examples of the alcohol serving as the specified hydrophobic compound will be described.

In the following specific examples, compound names are immediately followed by parentheses including, for example, "C8", which describes the number of the carbon atoms of the alkyl group. For example, "C8" means that the alkyl group has 8 carbon atoms.

Examples of the alcohol (specifically, an alcohol having an alkyl group having 8 or more carbon atoms) include 1-octanol (C8), 2-ethylhexanol (C8), 1-nonanol (C9), 1-decanol (C10), undecyl alcohol (C11), lauryl alcohol (C12), tridecyl alcohol (C13), 1-tetradecanol (C14), pentadecyl alcohol (C15), 1-hexadecanol (C16), 1-heptadecanol (C17), stearyl alcohol (another name: 1-octadecanol) (C18), isostearyl alcohol (C18), nonadecyl alcohol (C19), 1-eicosanol (C20), 2-octyldodecanol (C20), heneicosanol (C21), 1-docosanol (C22), and 1-tetracosanol (C24).

The concept of the ether (specifically, an ether having an alkyl group having 8 or more carbon atoms) encompasses polyethers.

The ether (specifically, an ether having an alkyl group having 8 or more carbon atoms) is preferably a polyether, more preferably a polyoxyethylene alkyl ether (such as polyoxyethylene lauryl ether or polyoxyethylene stearyl ether) or a polyoxypropylene alkyl ether.

Examples of the ester (specifically, an ester having an alkyl group having 8 or more carbon atoms) include aliphatic carboxylic acid alkyl esters such as methyl nonanoate, methyl laurate, methyl stearate, and methyl docosanoate.

The concept of the ester (specifically, an ester having an alkyl group having 8 or more carbon atoms) encompasses polyesters.

The specified hydrophobic compound is, from the viewpoint of providing an image having higher scratch resistance, preferably an alcohol or an ether.

The specified hydrophobic compound is, from the viewpoint of providing an image having higher hardness, preferably an alcohol.

The specified hydrophobic compound preferably has a melting point of more than 25° C.

In this case, in an environment at room temperature (for example, 25° C.), the specified hydrophobic compound in a formed image tends to be present as solid, so that the image has higher scratch resistance and higher hardness.

The specified hydrophobic compound more preferably has a melting point of 28° C. or more, more preferably 33° C. or more, still more preferably 40° C. or more, particularly preferably 50° C. or more.

The upper limit of the melting point of the specified hydrophobic compound is not particularly limited. From the viewpoint of ease of production of or ease of availability of the specified hydrophobic compound, the specified hydrophobic compound more preferably has a melting point of 80° C. or less.

The alkyl group of the specified hydrophobic compound may be a linear alkyl group or a branched alkyl group; from the viewpoint of providing an image having higher scratch resistance and higher hardness, the alkyl group is more preferably a linear alkyl group.

From the viewpoint of the scratch resistance of the image and the hardness of the image, the specified hydrophobic compound is more preferably an alcohol having a linear alkyl group having 8 or more (preferably 16 or more) carbon atoms, and particularly preferably 1-hexadecanol, 1-heptadecanol, stearyl alcohol, nonadecyl alcohol, 1-eicosanol, heneicosanol, 1-docosanol, or 1-tetracosanol.

As described above, the specified hydrophobic compound may be included in the specified particles, or may not be included in the specified particles.

The specified hydrophobic compound is, from the viewpoint of providing higher ejection stability in the case of ejecting the ink through ink jet nozzles (hereafter, also referred to as "ink ejection stability"), preferably included in the specified particles.

In the present disclosure, when the amount of the specified hydrophobic compound contained in the specified particles relative to the total amount of the specified hydrophobic compound in the ink is defined as the enclosure ratio (mass %) of the specified hydrophobic compound, the enclosure ratio (mass %) of the specified hydrophobic compound is, from the viewpoint of ink ejection stability, preferably 10 mass % or more, more preferably 50 mass % or more, still more preferably 70 mass % or more, still more preferably 80 mass % or more, still more preferably 90 mass % or more, still more preferably 95 mass % or more, still more preferably 97 mass % or more, particularly preferably 99 mass % or more.

When the ink includes two or more specified hydrophobic compounds, at least one specified hydrophobic compound preferably has an enclosure ratio satisfying such a preferred range.

The enclosure ratio (mass %) of the specified hydrophobic compound is determined in the following manner.

Method of Measuring Enclosure Ratio (Mass %) of Specified Hydrophobic Compound

The following procedures are performed under a condition of a liquid temperature of 25° C.

When the ink contains no pigments, this ink is directly treated by the following procedures. When the ink contains a pigment, the ink is first centrifuged to remove the pigment, and the ink from which the pigment has been removed is treated by the following procedures.

From the ink, two samples of the same mass (hereafter, referred to as "Sample 1" and "Sample 2") are first obtained.

To Sample 1, tetrahydrofuran (THF) in an amount of 100 times the mass of the total solid content of Sample 1 is added, and mixing is performed to prepare a diluted solution. The obtained diluted solution is centrifuged at 80000 rpm (round per minute) for 40 minutes. A supernatant liquid generated by the centrifugation (hereafter, referred to as "Supernatant liquid 1") is collected. As a result of this procedure, the entirety of the specified hydrophobic compound included in Sample 1 is inferentially extracted to Supernatant liquid 1. The mass of the specified hydrophobic compound included in the collected Supernatant liquid 1 is measured by liquid chromatography (for example, with a liquid chromatography apparatus from Waters Corporation). The determined mass of the specified hydrophobic compound is defined as the "total amount of specified hydrophobic compound".

Sample 2 is centrifuged under the same conditions as in the centrifugation performed for the diluted solution. A supernatant liquid generated by the centrifugation (hereafter, referred to as "Supernatant liquid 2") is collected. As a result of this procedure, the specified hydrophobic compound not enclosed within microcapsules (in other words, in a free state) in Sample 2 is inferentially extracted to Supernatant liquid 2. The mass of the specified hydrophobic compound included in the collected Supernatant liquid 2 is determined by liquid chromatography (for example, a liquid chromatography apparatus from Waters Corporation). The determined mass of the specified hydrophobic compound is defined as the "amount of free specified hydrophobic compound".

From the "total amount of specified hydrophobic compound" and the "amount of free specified hydrophobic compound", the enclosure ratio (mass %) of the specified hydrophobic compound is calculated with the following formula.

Enclosure ratio (mass %) of specified hydrophobic compound=((Total amount of specified hydrophobic compound−Amount of free specified hydrophobic compound)/Total amount of specified hydrophobic compound)×100

When the ink includes two or more specified hydrophobic compounds, the enclosure ratio of the entirety of the two or more specified hydrophobic compounds may be calculated from the total amount of the two or more specified hydrophobic compounds being determined as the "total amount of specified hydrophobic compound", and the total amount of two or more free specified hydrophobic compounds being determined as the "amount of free specified hydrophobic compound"; alternatively, the enclosure ratio of any one of the specified hydrophobic compounds may be calculated from the amount of any one of the specified hydrophobic compounds being determined as the "total amount of specified hydrophobic compound", and the amount of any one of the free specified hydrophobic compounds being determined as the "amount of free specified hydrophobic compound".

Incidentally, the enclosure ratio of a component other than the specified hydrophobic compound (for example, a polymerizable compound described later) can also be determined by the same method as in the enclosure ratio of the specified hydrophobic compound.

However, regarding a compound having a molecular weight of 1000 or more, the masses of the compound included in the above-described Supernatant liquid 1 and Supernatant liquid 2 are measured by gel permeation chromatography (GPC) as the "total amount of compound" and the "amount of free compound", and the enclosure ratio (mass %) of the compound is determined.

In this Specification, measurement by gel permeation chromatography (GPC) can be performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

The specified hydrophobic compound content is not particularly limited, but is, for example, relative to the total amount of the ink, 0.05 mass % to 0.90 mass %.

When the specified hydrophobic compound content relative to the total amount of the ink is 0.05 mass % or more, the image has higher scratch resistance. From the viewpoint of providing an image having higher scratch resistance, the specified hydrophobic compound content relative to the total amount of the ink is preferably 0.10 mass % or more.

When the specified hydrophobic compound content relative to the total amount of the ink is 0.90 mass % or less, higher ink ejection stability is provided. From the viewpoint of providing higher ink ejection stability, the specified hydrophobic compound content relative to the total amount of the ink is preferably 0.50 mass % or less.

The specified hydrophobic compound content is, from the viewpoint of providing an image having higher scratch resistance and higher ink ejection stability, relative to the total amount of the ink, particularly preferably 0.10 mass % to 0.50 mass %.

The alkyl group content of the specified hydrophobic compound is not particularly limited, but is, for example, relative to the total amount of the ink, 0.05 mass % to 0.80 mass %.

When the alkyl group content of the specified hydrophobic compound relative to the total amount of the ink is 0.05 mass % or more, the image has higher scratch resistance. From the viewpoint of providing an image having higher scratch resistance, the alkyl group content of the specified hydrophobic compound relative to the total amount of the ink is preferably 0.08 mass % or more.

When the alkyl group content of the specified hydrophobic compound relative to the total amount of the ink is 0.80 mass % or less, higher ink ejection stability is provided. From the viewpoint of providing higher ink ejection stability, the alkyl group content of the specified hydrophobic compound relative to the total amount of the ink is preferably 0.40 mass % or less.

The alkyl group content of the specified hydrophobic compound is, from the viewpoint of providing an image having higher scratch resistance and higher ink ejection stability, relative to the total amount of the ink, particularly preferably 0.08 mass % to 0.40 mass %.

The alkyl group content of the specified hydrophobic compound relative to the total amount of the ink is determined on the basis of the specified hydrophobic compound content relative to the total amount of ink, and the chemical structure of the specified hydrophobic compound.

The specified hydrophobic compound content, for example, relative to the total solid-content amount of the specified particles, is 0.30 mass % to 5.00 mass %.

When the specified hydrophobic compound content relative to the total solid-content amount of the specified particles is 0.30 mass % or more, the image has higher scratch resistance. From the viewpoint of providing an image having higher scratch resistance, the specified hydrophobic compound content relative to the total solid-content amount of the specified particles is preferably 0.50 mass % or more.

When the specified hydrophobic compound content relative to the total solid-content amount of the specified particles is 5.00 mass % or less, higher ink ejection stability is provided. From the viewpoint of providing higher ink ejection stability, the specified hydrophobic compound content relative to the total solid-content amount of the specified particles is preferably 2.50 mass % or less.

The specified hydrophobic compound content relative to the total solid-content amount of the specified particles is, from the viewpoint of providing an image having higher scratch resistance and higher ink ejection stability, particularly preferably 0.50 mass % to 2.50 mass %.

When the specified hydrophobic compound is included in the specified particles, the total solid-content amount of the specified particles includes the amount of the specified hydrophobic compound within the specified particles.

The alkyl group content of the specified hydrophobic compound is, for example, relative to the total solid-content amount of the specified particles, 0.25 mass % to 4.80 mass %.

When the alkyl group content of the specified hydrophobic compound relative to the total solid-content amount of the specified particles is 0.25 mass % or more, the image has higher scratch resistance. From the viewpoint of providing an image having higher scratch resistance, the alkyl group content of the specified hydrophobic compound relative to the total solid-content amount of the specified particles is preferably 0.40 mass % or more.

When the alkyl group content of the specified hydrophobic compound relative to the total solid-content amount of the specified particles is 4.80 mass % or less, higher ink ejection stability is provided. From the viewpoint of providing higher ink ejection stability, the alkyl group content of the specified hydrophobic compound relative to the total solid-content amount of the specified particles is preferably 2.00 mass % or less.

The alkyl group content of the specified hydrophobic compound relative to the total solid-content amount of the specified particles is, from the viewpoint of providing an image having higher scratch resistance and higher ink ejection stability, particularly preferably 0.40 mass % to 2.00 mass %.

The alkyl group content of the specified hydrophobic compound relative to the total solid-content amount of the specified particles is determined on the basis of the specified hydrophobic compound content relative to the total solid-content amount of the specified particles determined by the above-described method, and the chemical structure of the specified hydrophobic compound.

Specified Particles

The specified particles include a specified polymer (specifically, a polymer having at least one of a urethane bond or a urea bond), and have a polymerizable group.

Specified Polymer

The specified particles include at least one specified polymer.

The specified polymer has at least one of a urethane bond or a urea bond.

The specified polymer may be a linear polymer not having a crosslinked structure (hereafter, also referred to as "specified chain polymer"), or may be a polymer having a crosslinked structure (for example, a three-dimensional crosslinked structure) (hereafter, also referred to as "specified crosslinked polymer").

The chain polymer may include, in the main chain, a cyclic structure such as an aliphatic ring, an aromatic ring, or a heterocycle.

Regarding the three-dimensional crosslinked structure optionally present in the specified crosslinked polymer, reference may be made to three-dimensional crosslinked structures described in WO2016/052053A.

Specified Chain Polymer

The specified chain polymer is preferably a reaction product of at least one selected from the group consisting of bifunctional isocyanate compounds, and at least one selected from the group consisting of compounds intramolecularly having two active hydrogen groups and water, or a reaction product of at least one selected from the group consisting of bifunctional isocyanate compounds, at least one selected from the group consisting of compounds intramolecularly having two active hydrogen groups and water, and another compound.

In this Specification, such an active hydrogen group means a hydroxy group, a primary amino group, a secondary amino group, or a thiol group.

Examples of such a compound intramolecularly having two active hydrogen groups include diol compounds, diamine compounds, and dithiol compounds.

For example, a reaction of a bifunctional isocyanate compound and a diol compound forms urethane bonds.

A reaction of a bifunctional isocyanate compound and a diamine compound forms urea bonds.

A reaction of a bifunctional isocyanate compound and water forms urea bonds.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

Examples of the bifunctional isocyanate compounds for forming the specified chain polymer include the following Compounds (1-1) to (1-20).

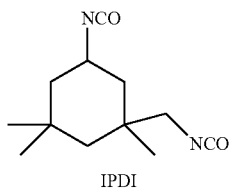
IPDI (1-1)

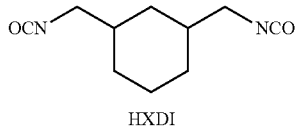
HXDI (1-2)

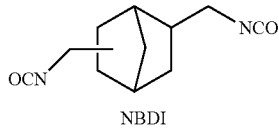
NBDI (1-3)

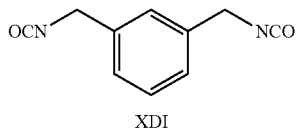
XDI (1-4)

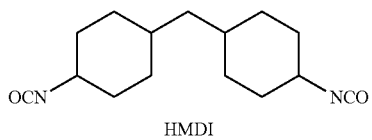
HMDI (1-5)

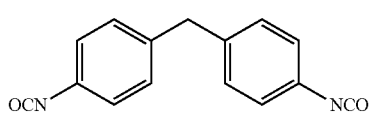
MDI (1-6)

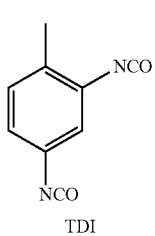
TDI (1-7)

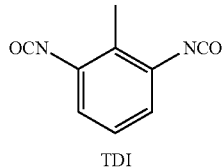
TDI (1-8)

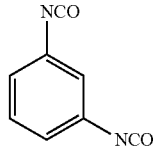
(1-9)

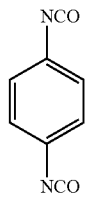
(1-10)

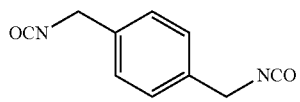
(1-11)

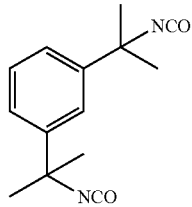
(1-12)

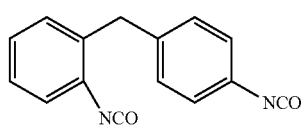
(1-13)

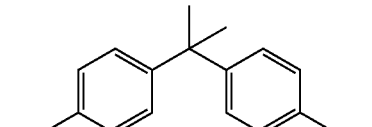
(1-14)

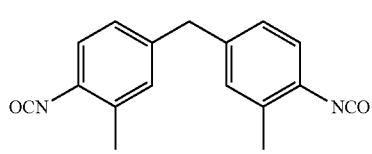
(1-15)

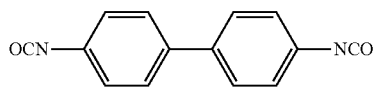
(1-16)

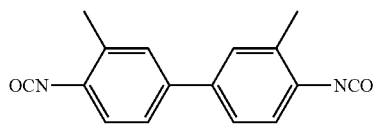
(1-17)

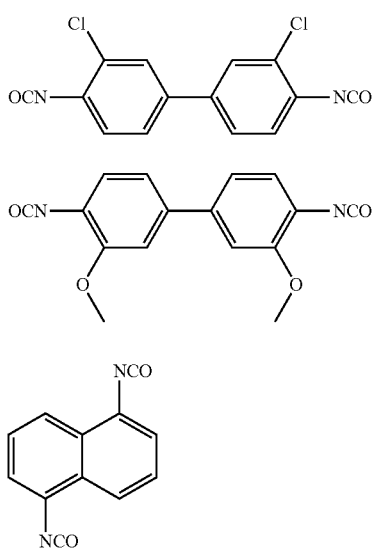
Examples of the compounds intramolecularly having two active hydrogen groups and used for forming the specified chain polymer include the following Compounds (2-1) to (2-24).
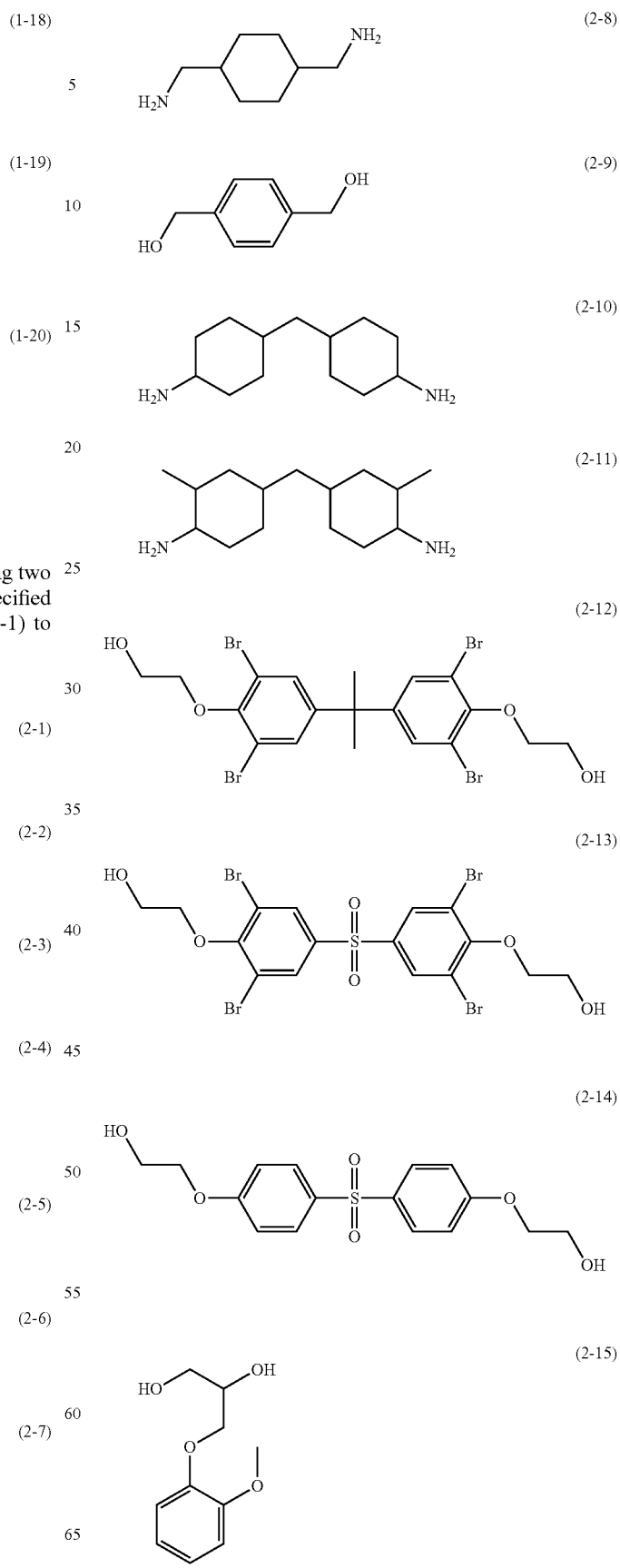

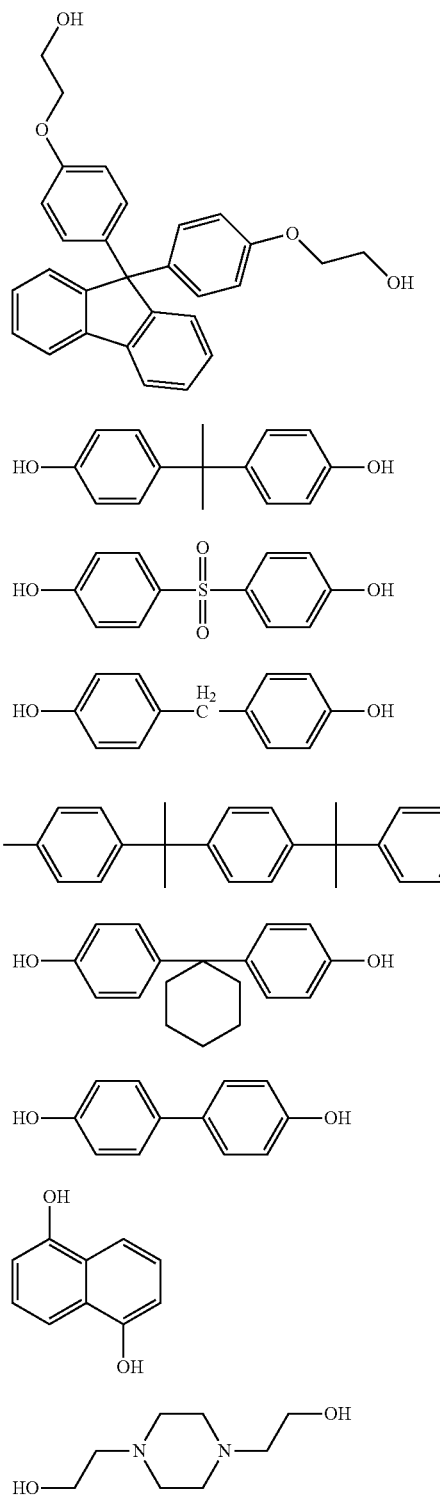

Other examples of the compounds intramolecularly having two active hydrogen groups and used for forming the specified chain polymer include, among polymerizable-group-introducing compounds described later, compounds including two active hydrogen groups, and, among hydrophilic-group-introducing compounds described later, compounds including two active hydrogen groups.

Specified Crosslinked Polymer

The specified crosslinked polymer is preferably a reaction product of at least one selected from the group consisting of tri- or higher functional isocyanate compounds, and at least one selected from the group consisting of compounds intramolecularly having two or more active hydrogen groups and water, or a reaction product of at least one selected from the group consisting of tri- or higher functional isocyanate compounds, at least one selected from the group consisting of compounds intramolecularly having two or more active hydrogen groups and water, and another compound.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

When the specified particles include the specified crosslinked polymer, the specified particles preferably include microcapsules (hereafter, "MC") including a shell composed of the specified crosslinked polymer and a core.

Examples of the compound used for forming the specified crosslinked polymer and intramolecularly having two or more active hydrogen groups include, as in the above-described compound intramolecularly having two active hydrogen groups and used for forming the specified chain polymer, diol compounds, diamine compounds, and dithiol compounds.

Other examples of the compound used for forming the specified crosslinked polymer and intramolecularly having two or more active hydrogen groups include tri- or higher functional polyol compounds, tri- or higher functional polyamine compounds, and tri- or higher functional polythiol compounds.

Such a tri- or higher functional isocyanate compound for forming the specified crosslinked polymer is preferably a reaction product of at least one selected from the group consisting of bifunctional isocyanate compounds, and at least one selected from the group consisting of compounds intramolecularly having three or more active hydrogen groups (such as tri- or higher functional polyol compounds, tri- or higher functional polyamine compounds, and tri- or higher functional polythiol compounds).

The number of moles (the number of molecules) of such a bifunctional isocyanate compound that is to react with such a compound intramolecularly having three or more active hydrogen groups is preferably 0.6 or more times, more preferably 0.6 times to 5 times, still more preferably 0.6 times to 3 times, still more preferably 0.8 times to 2 times, the number of moles of the active hydrogen groups (the number of equivalents of the active hydrogen groups) of the compound intramolecularly having three or more active hydrogen groups.

Examples of the bifunctional isocyanate compound for forming the tri- or higher functional isocyanate compound include the same as those described above for the bifunctional isocyanate compound for forming the specified chain polymer.

Examples of the compound intramolecularly having three or more active hydrogen groups for forming the tri- or higher functional isocyanate compound include compounds having structures represented by the following (H-1) to (H-13). In the following structures, n represents an integer selected from 1 to 100.
(H-1)
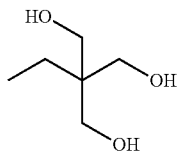
(H-2)
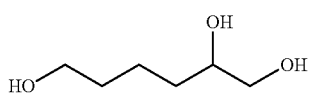
(H-3)
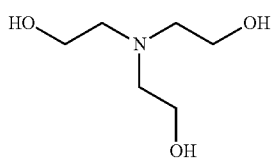
(H-4)
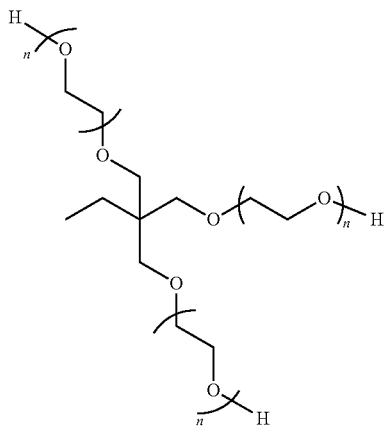
(H-5)
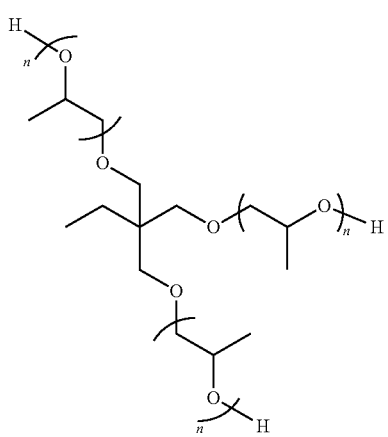
(H-6)
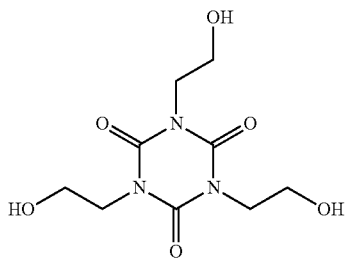
(H-7)
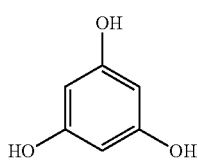
(H-8)
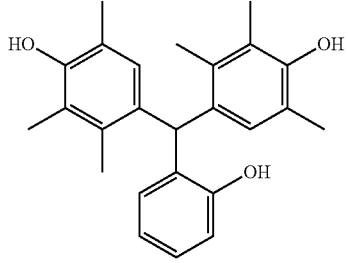
(H-9)
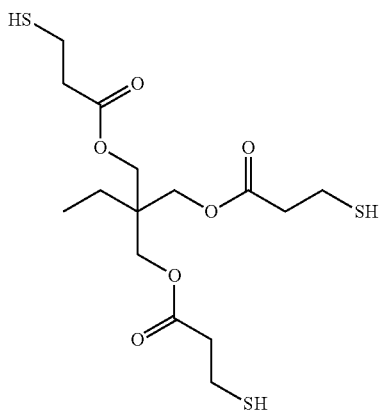
(H-10)
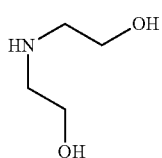

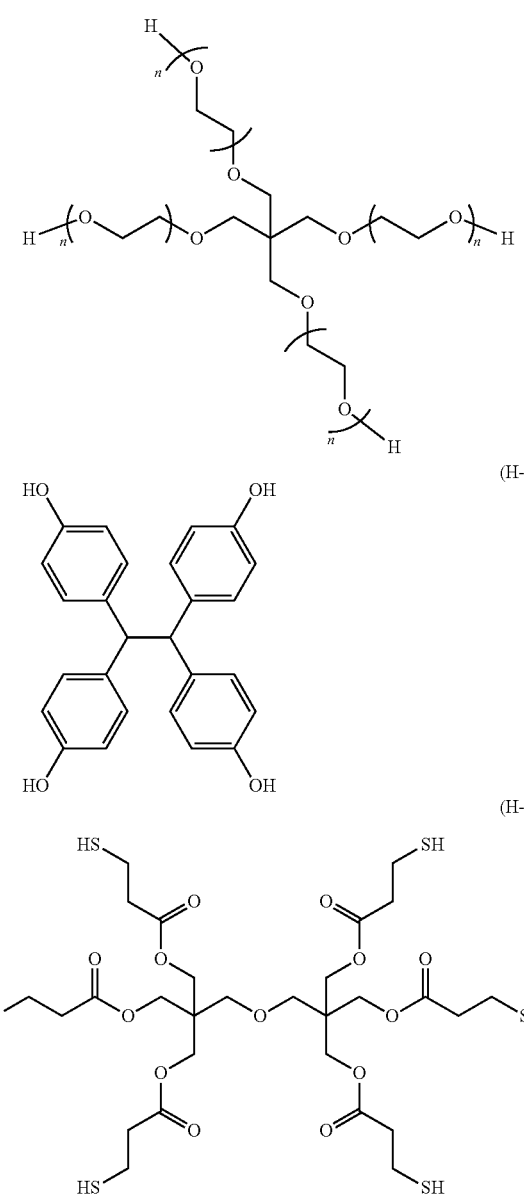

Examples of the tri- or higher functional isocyanate compound for forming the specified crosslinked polymer include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of the commercially available products of the isocyanurate-type tri- or higher functional isocyanate compounds include TAKENATE (registered trademark) D-127N, D-170N, D-17OHN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), and DURANATE (registered trademark) TPA-100, TKA-100, TSA-100, TSS-100, TLA-100, and TSE-100 (all from Asahi Kasei Corporation).

Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

When the specified particles include MC (namely, microcapsules) including a shell composed of the specified crosslinked polymer and a core, the specified particles may contain, as a dispersing agent for MC, among the above-described specified chain polymers, a specified chain polymer having a hydrophilic group. In this case, in the ink, at least peripheral portions of the shells of MC can be covered with the specified chain polymer serving as a dispersing agent. In this case, an interaction between a urethane bond and/or a urea bond of the shells of MC and a urethane bond and/or a urea bond of the dispersing agent (specified chain polymer), and the dispersing effect exerted by the hydrophilic group of the dispersing agent synergistically provide higher dispersion stability of the specified particles.

In this case, the ratio of the amount of the dispersing agent to the total solid-content amount of MC (hereafter, also referred to as the mass ratio [dispersing agent/MC solid content]) is preferably 0.005 to 1.000, more preferably 0.05 to 0.7.

When the mass ratio [dispersing agent/MC solid content] is 0.005 or more, the specified particles exhibit higher dispersion stability.

When the mass ratio [dispersing agent/MC solid content] is 1.000 or less, the image has higher hardness.

Preferred Weight-Average Molecular Weight (Mw) of Specified Polymer

The weight-average molecular weight (Mw) of the specified polymer is, from the viewpoint of the dispersion stability of the ink (specifically, the dispersion stability of the specified particles), preferably 5000 or more, more preferably 7000 or more, still more preferably 8000 or more, particularly preferably 10000 or more.

The upper limit of Mw of the specified polymer is not particularly limited. The upper limit of Mw of the specified polymer is, for example, 150000, 100000, 70000, or 50000.

In this Specification, the weight-average molecular weight (Mw) means a value measured by gel permeation chromatography (GPC). The conditions of GPC are the same as those described above.

The specified polymer content relative to the solid-content amount of the specified particles is preferably 10 mass % or more, more preferably 20 mass % or more.

When the specified polymer content relative to the solid-content amount of the specified particles is 10 mass % or more, the ink has higher dispersion stability (specifically, the dispersion stability of the specified particles).

The specified polymer content relative to the solid-content amount of the specified particles may be 100 mass %, but is preferably 80 mass % or less, more preferably 70 mass % or less, particularly preferably 50 mass % or less.

Polymerizable Group

The specified particles have at least one polymerizable group species.

The polymerizable group of the specified particles contributes to curing of an image caused by, for example, light, heat, or infrared radiation.

The polymerizable group of the specified particles may covalently bond to the specified polymer, or may not covalently bond to the specified polymer. Stated another way, the specified polymer may have a polymerizable group, or the specified polymer may not have a polymerizable group.

The specified particles having a polymerizable group not covalently bonding to the specified polymer mean that the specified particles include a compound having a polymerizable group (namely, a polymerizable compound).

The specified particles including a polymerizable group covalently bonding to the specified polymer mean that the specified polymer itself has a polymerizable group.

The polymerizable group is preferably a photopolymerizable group or a thermal-polymerizable group.

The photopolymerizable group is preferably a radical-polymerizable group, more preferably a group including an ethylenically double bond, still more preferably a (meth)acryloyl group, an allyl group, a styryl group, or a vinyl group. The radical-polymerizable group is, from the viewpoint of radical polymerization reactivity and the hardness of a film to be formed, particularly preferably a (meth)acryloyl group.

The thermal-polymerizable group is preferably an epoxy group, an oxetanyl group, an aziridinyl group, an azetidinyl group, a ketone group, an aldehyde group, or a blocked isocyanate group.

The specified particles may contain one polymerizable group species alone, or may contain two or more polymerizable group species.

The fact that the specified particles have a polymerizable group can be confirmed by, for example, Fourier transform infrared spectroscopy (FT-IR).

In the ink of the present disclosure, from the viewpoint of providing an image having higher hardness, the specified particles preferably include a polymerizable compound (specifically, a photopolymerizable compound or a thermal-polymerizable compound).

Preferred examples of the polymerizable compound included in the specified particles will be described later.

Polymerizable-Group-Introducing Compound

In the case of the specified polymer having a polymerizable group, the polymerizable group can be introduced into the specified polymer by using a polymerizable-group-introducing compound.

The polymerizable-group-introducing compound may be a compound having a polymerizable group and an active hydrogen group.

The polymerizable-group-introducing compound is preferably a compound having one or more polymerizable groups and two or more active hydrogen groups.

The method of introducing a polymerizable group into the specified polymer is not particularly limited. A particularly preferred method is, during synthesis of the specified polymer, to cause a reaction of at least one selected from the group consisting of bifunctional isocyanate compounds, at least one selected from the group consisting of water, diol compounds, diamine compounds, and dithiol compounds, and at least one polymerizable-group-introducing compound (and optionally at least one hydrophilic-group-introducing compound).

Such polymerizable-group-introducing monomer species may be used alone or in combination of two or more thereof.

Other examples of the polymerizable-group-introducing compound include compounds described in Paragraphs 0075 to 0089 of WO2016/052053A.

The polymerizable-group-introducing compound is preferably a compound represented by the following formula (ma).

$$L^1Lc_mZ_n \qquad (ma)$$

In the formula (ma), $L^1$ represents an m+n-valent linking group; m and n each independently represent an integer selected from 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

m and n each independently represent preferably 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

The active hydrogen group represented by Z is more preferably a hydroxy group or a primary amino group, still more preferably a hydroxy group.

The following are examples of the polymerizable-group-introducing compound; however, the polymerizable-group-introducing compound is not limited to the following examples. Incidentally, n's in Compounds (a-3) and (a-14) represent, for example, an integer selected from 1 to 90.

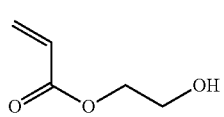

(a-1)

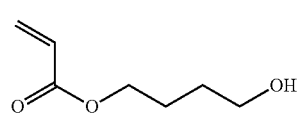

(a-2)

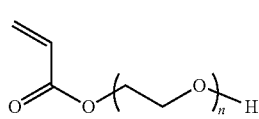

(a-3)

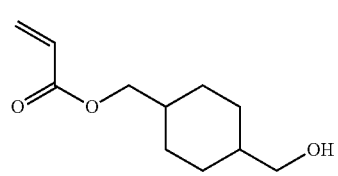

(a-4)

(a-5)
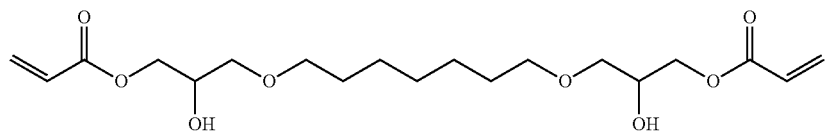
(a-6)
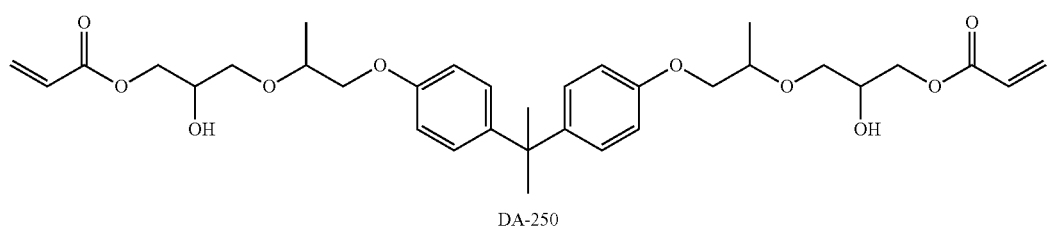
DA-250
(a-7)
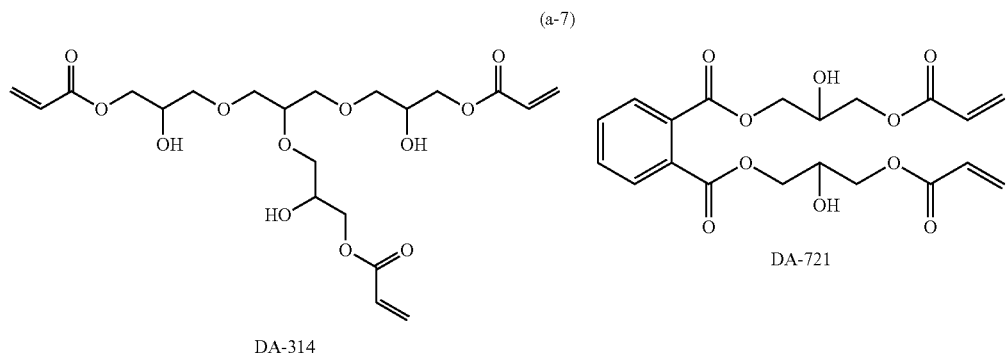
DA-314
(a-8)
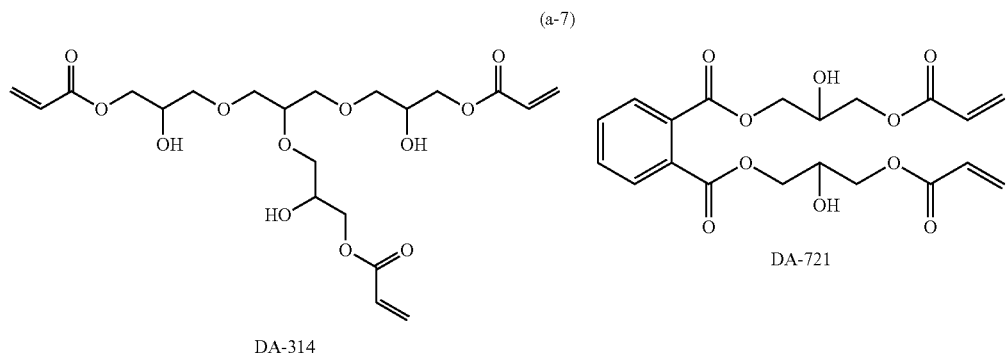
DA-721
(a-9)
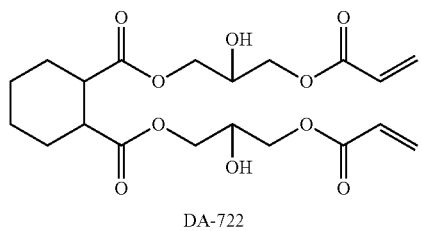
DA-722
(a-10)
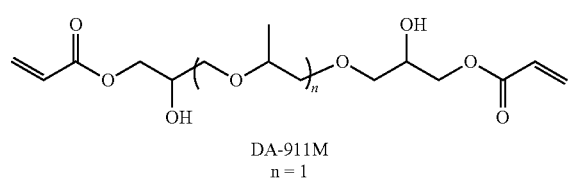
DA-911M
n = 1
(a-11)
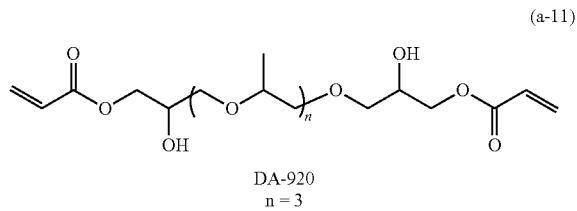
DA-920
n = 3
(a-12)
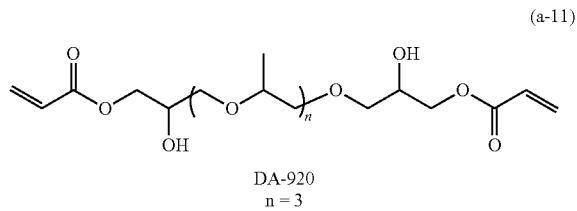
DA-931
n = 11
(a-13)
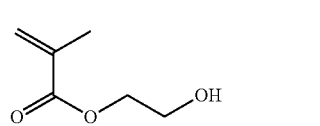
(a-14)
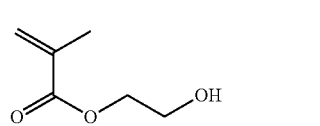

-continued

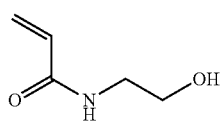
(a-15)

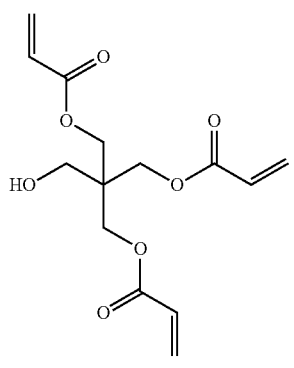
A-TMM-3L
(a-16)

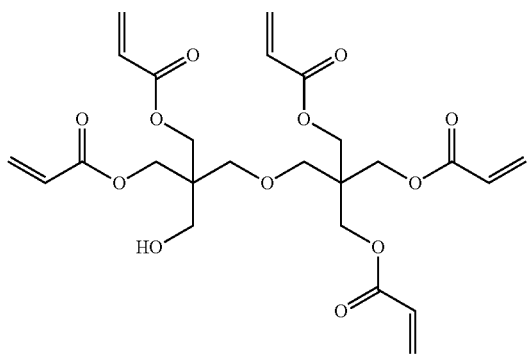
SR399E
(a-17)

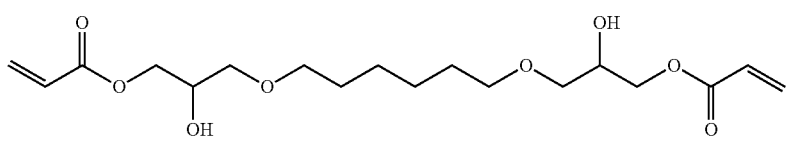
(a-18)

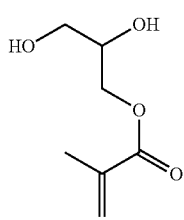
(a-19)

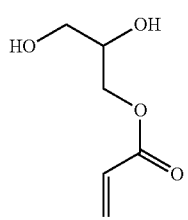
(a-20)

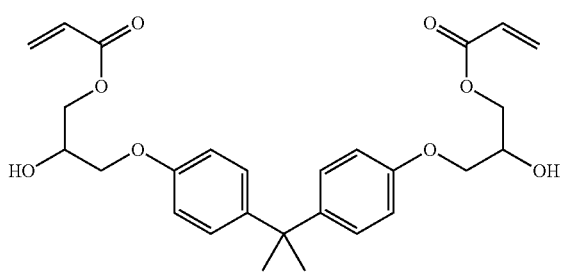
(a-21)

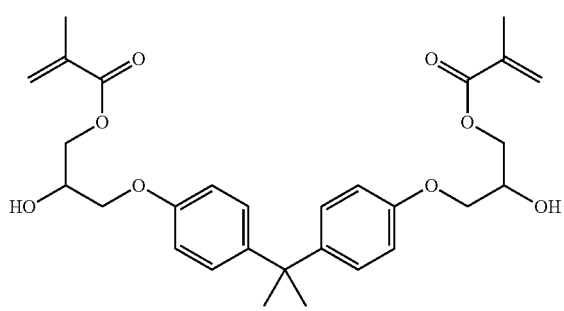
(a-22)

Polymerizable-Group-Introduced Isocyanate Compound

In the case of the specified polymer having a polymerizable group, the polymerizable group can also be introduced into the specified polymer by using a polymerizable-group-introduced isocyanate compound.

Examples of the polymerizable-group-introduced isocyanate compound include:

a reaction product of at least one of the above-described polymerizable-group-introducing compounds, and at least one of bifunctional isocyanate compounds;

a reaction product of at least one of the above-described polymerizable-group-introducing compounds, and at least one of tri- or higher functional isocyanate compounds; and a reaction product of at least one of the above-described polymerizable-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Hydrophilic Group

The specified particles may have at least one hydrophilic group species.

When the specified particles have a hydrophilic group, the ink has higher dispersion stability (for example, storage stability and ejection stability).

The hydrophilic group is preferably an anionic group or a nonionic group, and, from the viewpoint of a strong effect of providing higher dispersion stability, preferably an anionic group.

For example, a comparison between an anionic group and a nonionic group of the same molecular weight reveals that the anionic group exerts a stronger effect of providing higher dispersion stability. Thus, an anionic group (particularly preferably at least one selected from the group consisting of a carboxy group and salts of a carboxy group), even in the case of having a low molecular weight, can sufficiently exert the effect of providing higher dispersion stability.

The nonionic group may be a group having a polyether structure, preferably a monovalent group including a polyalkyleneoxy group.

The anionic group may be an unneutralized anionic group, or may be a neutralized anionic group.

Examples of the unneutralized anionic group include a carboxy group, a sulfo group, a sulfuric acid group, a phosphonic acid group, and a phosphoric acid group.

Examples of the neutralized anionic group include salts of a carboxy group, salts of a sulfo group, salts of a sulfuric acid group, salts of a phosphonic acid group, and salts of phosphoric acid group.

In this Specification, "a carboxy group is neutralized" means that a carboxy group as an anionic group is turned into the form of a "salt" (for example, "—COONa"). The same applies to, as anionic groups, a sulfo group, a sulfuric acid group, a phosphonic acid group, and a phosphoric acid group.

The neutralization may be achieved by using, for example, an alkali metal hydroxide (for example, sodium hydroxide or potassium hydroxide) or an organic amine (for example, triethylamine).

The anionic group that may be included in the specified particles is, from the viewpoint of dispersion stability, preferably at least one selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group, more preferably at least one selected from the group consisting of a carboxy group and salts of a carboxy group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the specified particles have a neutralized anionic group, the neutralization degree of the anionic group (such as a carboxy group) of the specified particles is preferably 50% to 100%.

In this Specification, the "neutralization degree of the anionic group" means, for all the anionic groups of the specified particles, a ratio of the number of moles of neutralized anionic groups to the total of the number of moles of neutralized anionic groups and the number of moles of unneutralized anionic groups [Number of moles of neutralized acid groups/(Number of moles of neutralized acid groups+Number of moles of unneutralized acid groups).]

When the neutralization degree of the anionic group is 50% or more, the specified particles have higher dispersion stability.

The neutralization degree of the anionic group is preferably 50% to 95%, more preferably 80% to 95%, still more preferably 90% to 95%.

The neutralized anionic group (specifically, the anionic group in the form of salt) exhibits basicity. When the neutralization degree of the anionic group is 95% or less, hydrolysis of a urethane bond and/or a urea bond of the specified polymer can be further suppressed.

The neutralization degree can be determined by neutralization titration.

Hydrophilic-Group-Introducing Compound

In the case of the specified particles in which the specified polymer has a hydrophilic group, the hydrophilic group can be introduced into the specified polymer by using a hydrophilic-group-introducing compound.

The hydrophilic-group-introducing compound may be a compound having a hydrophilic group and an active hydrogen group.

The hydrophilic-group-introducing compound is preferably a compound having one or more hydrophilic groups and two or more active hydrogen groups.

Among hydrophilic-group-introducing compounds, examples of anionic-group-introducing compounds include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Specific examples of the anionic-group-introducing compound include, in addition to the above-described α-amino acids, the following.

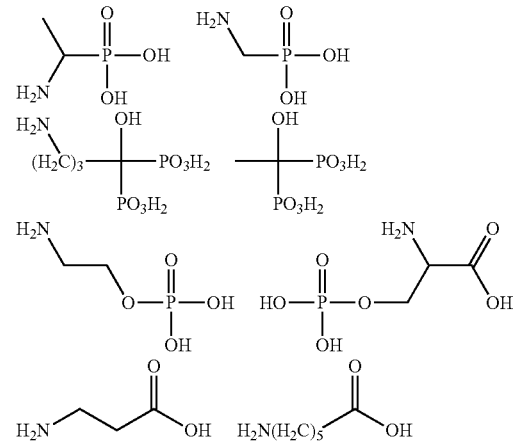

-continued

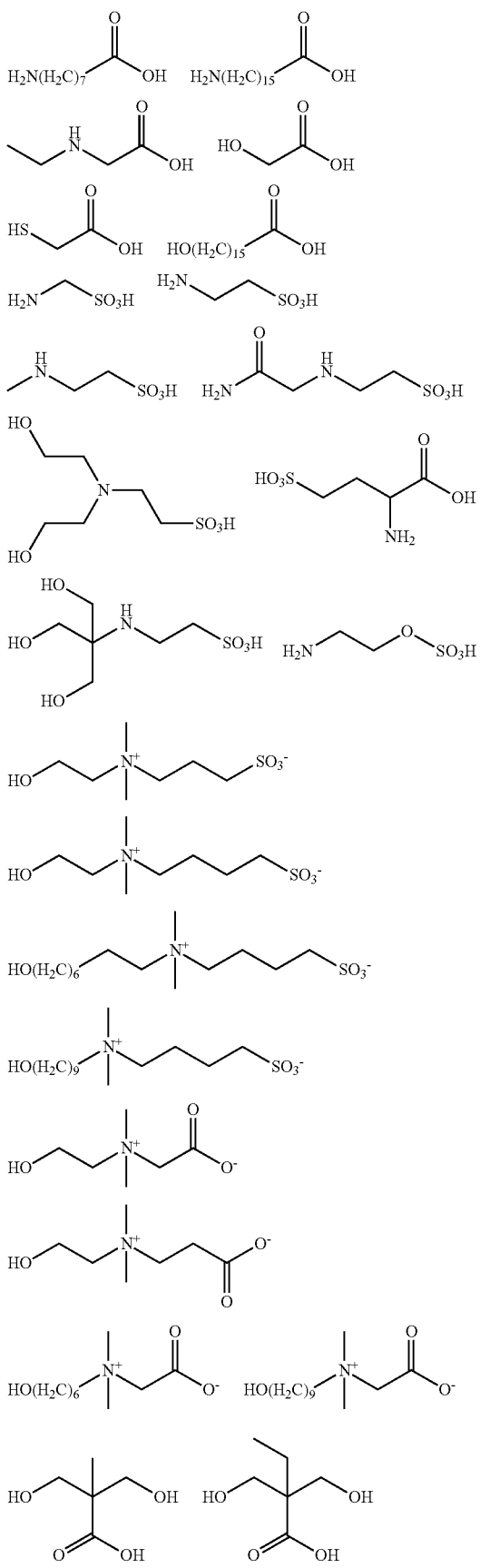

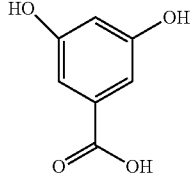

In such an anionic-group-introducing compound, the anionic group may be at least partially neutralized using, for example, an inorganic base such as sodium hydroxide or potassium hydroxide, or an organic base such as triethylamine.

Among the hydrophilic-group-introducing compounds, the nonionic-group-introducing compound is preferably a compound having a polyether structure, more preferably a compound having a polyoxyalkylene group.

Hydrophilic-Group-Introduced Isocyanate Compound

In the case of the specified particles in which the specified polymer has a hydrophilic group, the hydrophilic group can also be introduced into the specified polymer by using a hydrophilic-group-introduced isocyanate compound.

Examples of the hydrophilic-group-introduced isocyanate compound include:

a reaction product of at least one of the above-described hydrophilic-group-introducing compounds, and at least one of bifunctional isocyanate compounds;

a reaction product of at least one of the above-described hydrophilic-group-introducing compounds, and at least one of tri- or higher functional isocyanate compounds; and a reaction product of at least one of the above-described hydrophilic-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Specific examples of the hydrophilic-group-introduced isocyanate compound include adducts of trimethylolpropane (TMP), m-xylylene diisocyanate (XDI), and polyethylene glycol monomethyl ether (EO) (for example, TAKENATE (registered trademark) D-116N, manufactured by Mitsui Chemicals, Inc.).

Polymerizable Compound

The specified particles preferably include, as a compound having a polymerizable group (such as a photopolymerizable group or a thermal-polymerizable group), a polymerizable compound (such as a photopolymerizable compound or a thermal-polymerizable compound). In this case, an image having higher hardness is provided.

When the specified particles include a polymerizable compound, the specified particles may include a single polymerizable compound alone, or two or more polymerizable compounds. When the specified particles include a polymerizable compound, the polymerizable group of the polymerizable compound functions as the polymerizable group of the specified particles.

Incidentally, in the case of the specified particles including a polymerizable compound, the specified polymer may have a polymerizable group.

The polymerizable compound that can be included in the specified particles may be compounds described in Paragraphs 0097 to 0105 of WO2016/052053A.

The polymerizable compound that can be included in the specified particles is preferably a photopolymerizable compound, which is polymerized upon irradiation with light, or a thermal-polymerizable compound, which is polymerized upon heating or irradiation with infrared radiation. The photopolymerizable compound is preferably a radical-polymerizable compound having an ethylenically double bond that enables radical polymerization.

The polymerizable compound that can be included in the specified particles may be any one of a polymerizable monomer, a polymerizable oligomer, and a polymerizable polymer, but is preferably a polymerizable monomer from the viewpoint of providing a film having higher curing sensitivity and higher hardness. In particular, more preferred polymerizable compounds are photopolymerizable monomers encompassed within the concept of photopolymerizable compounds and thermal-polymerizable monomers encompassed within the concept of thermal-polymerizable compounds.

When the specified particles include, as a polymerizable compound, a photopolymerizable compound, the specified particles preferably further include a photopolymerization initiator described later.

When the specified particles include, as a polymerizable compound, a thermal-polymerizable compound, the specified particles preferably further include a photothermal conversion agent, a thermal curing accelerator, or a photothermal conversion agent and a thermal curing accelerator described later.

The content (total content in the case of including two or more species) of the polymerizable compound (preferably a polymerizable monomer. The same applies to the following description.) that can be included in the specified particles relative to the solid-content amount of the specified particles is, from the viewpoint of providing a film having higher curing sensitivity and higher hardness, preferably 10 mass % to 90 mass %, more preferably 20 mass % to 80 mass %, still more preferably 30 mass % to 70 mass %.

From the viewpoint of providing an image having higher adhesion to the substrate, at least one polymerizable compound (such as a photopolymerizable compound) that can be included in the specified particles is preferably a polymerizable compound having a cyclic structure (hereafter, also referred to as "cyclic polymerizable compound").

From the viewpoint of providing an image having higher adhesion to the substrate, at least one polymerizable compound (such as a photopolymerizable compound) that can be included in the specified particles is preferably a polymerizable compound including, in a single molecule, one or more cyclic structures and two or more (meth)acryloyl groups (hereafter, also referred to as "bi- or higher functional cyclic polymerizable compound").

Examples of the bi- or higher functional cyclic polymerizable compound include:

tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a polymerizable compound, the percentage of a bi- or higher functional cyclic polymerizable compound relative to the whole polymerizable compound is preferably 10 mass % to 100 mass %, more preferably 30 mass % to 100 mass %, particularly preferably 40 mass % to 100 mass %.

The specified particles may include a bi- or lower functional polymerizable compound (preferably a bi- or lower functional polymerizable monomer. The same applies to the following description.), and a tri- or higher functional polymerizable compound (preferably a tri- or higher functional polymerizable monomer. The same applies to the following description.).

When the specified particles include a bi- or lower functional polymerizable compound and a tri- or higher functional polymerizable compound, the bi- or lower functional polymerizable compound inferentially contributes to adhesion of the film to the substrate, and the tri- or higher functional polymerizable compound inferentially contributes to higher hardness of the film.

The molecular weight of the polymerizable compound is preferably a weight-average molecular weight of 100 to 100000, more preferably 100 to 30000, still more preferably 100 to 10000, still more preferably 100 to 4000, still more preferably 100 to 2000, still more preferably 100 to 1000, still more preferably 100 to 900, still more preferably 100 to 800, particularly preferably 150 to 750.

The weight-average molecular weight of the polymerizable compound is measured by gel permeation chromatography (GPC). The measurement conditions of GPC are the same as those described above. However, when the molecular weight is so low that the weight-average molecular weight cannot be accurately measured by GPC, the molecular weight determined from the chemical structure of the polymerizable compound is employed as the weight-average molecular weight of the polymerizable compound.

Polymerizable Monomer

The polymerizable monomer that can be included in the specified particles may be a photopolymerizable monomer, which is polymerized and cured upon irradiation with light, or a thermal-polymerizable monomer, which is polymerized and cured upon heating or irradiation with infrared radiation.

In the case of including, as a polymerizable compound, the photopolymerizable monomer, a photopolymerization initiator described later is preferably included. In the case of including, as a polymerizable compound, the thermal-polymerizable monomer, a photothermal conversion agent, a thermal curing accelerator, or a photothermal conversion agent and a thermal curing accelerator described later are preferably included.

Photopolymerizable Monomer

The photopolymerizable monomer can be selected from the group consisting of a polymerizable monomer having an ethylenically unsaturated bond that enables radical polymerization (namely, a radical-polymerizable monomer) and a polymerizable monomer having a cationic-polymerizable group that enables cationic polymerization (namely, a cationic-polymerizable monomer).

Examples of the radical-polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The radical-polymerizable monomer is preferably a compound having an ethylenically unsaturated group.

When the specified particles include the radical-polymerizable monomer, the specified particles may include a single radical-polymerizable monomer species alone, or may include two or more radical-polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyl oxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stil acrylate, isostearyl acrylate, 2-ethylhexyldiglycol acrylate, 2-hydroxybutyl acrylate, 2-acryloyloxyethylhydrophthalic acid, ethoxy di ethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethyl succinic acid, 2-acryloyloxyphthalic acid, 2-acryloxyethyl-2-hydroxyethylphthalic acid, lactone-modified acrylate, acryloyl morpholine, acrylamide, and substituted acrylamide (such as N-methylol acrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methyl styrene, α-methyl styrene, and p-methoxy-β-methyl styrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinylethylacetamide, N-vinyl succinimide, N-vinylphthalimide, N-vinylcaprolactam, and N-vinylimidazole.

Other examples of the radical-polymerizable monomer include allyl glycidyl ether, diallyl phthalate, triallyl trimellitate, and N-vinylamide such as N-vinylformamide.

Of these radical-polymerizable monomers, the bi- or lower functional radical-polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional radical-polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The combination of the bi- or lower functional radical-polymerizable monomer and the tri- or higher functional radical-polymerizable monomer is, for example, the combination of a bifunctional acrylate compound and a trifunctional acrylate compound, the combination of a bifunctional acrylate compound and a pentafunctional acrylate compound, or the combination of a monofunctional acrylate compound and a tetrafunctional acrylate compound.

The radical-polymerizable monomer is preferably
a monomer having a cyclic structure;
more preferably the above-described preferred compound group of bi- or higher functional cyclic polymerizable compounds, cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, or ε-caprolactone-modified tris-(2-acryloxyethyl) isocyanurate;
still more preferably the above-described preferred compound group of bi- or higher functional cyclic polymerizable compounds, dicyclopentenyl acrylate, dicyclopentenyloxyethyl acrylate, or dicyclopentanyl acrylate; or
particularly preferably the above-described preferred compound group of bi- or higher functional cyclic polymerizable compounds.

In addition to the above-described radical-polymerizable monomers, there are other usable radical-polymerizable monomers such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical-polymerizable and crosslinkable monomers publicly known in industry.

Examples of the cationic-polymerizable monomer include an epoxy compound, a vinyl ether compound, and an oxetane compound.

The cationic-polymerizable monomer is preferably a compound having at least one olefin, thioether, acetal, thioxane, thietane, aziridine, N heterocycle, 0 heterocycle, S heterocycle, P heterocycle, aldehyde, lactam, or cyclic ester group.

The cationic-polymerizable monomer may be compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

There are also photopolymerizable monomers that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These monomers are also applicable as polymerizable monomers that can be included in the specified particles.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N (NDDA, bifunctional), A-DOD-N (DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all from Nippon Kayaku Co., Ltd.).

In addition, preferred examples of the polymerizable monomer include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Among these commercially available products, in particular, preferred are photopolymerizable monomers having a cyclic structure that are SR506, SR833S, A-9300, and A-9300-CL, particularly preferred is SR833S.

Thermal-Polymerizable Monomer

The thermal-polymerizable monomer can be selected from the group consisting of polymerizable monomers that can be polymerized by being heated or irradiated with infrared radiation. Examples of the thermal-polymerizable monomer include compounds such as epoxy, oxetane, aziridine, azetidine, ketone, aldehyde, and blocked isocyanate.

Of these, examples of the epoxy compound include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

Examples of the oxetane compound include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compound include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (dimethylamine, diisopropylamine, di-n-propylamine, and diisobutylamine), alicyclic amine (such as methylhexylamine and dicyclohexylamine), and aromatic amine (such as aniline and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole and 2-methylimidazole], pyrazole [such as pyrazole, 3-methylpyrazole, and 3,5-dimethylpyrazole], imine [such as ethyleneimine and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, the blocking agent is preferably oxime, lactam, pyrazole, active methylene, or amine.

The blocked isocyanate compound may be a commercially available product on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph 0064 in WO2015/158654A.

The specified particles including a polymerizable monomer can be produced by, for example, mixing an oil-phase component including a specified chain polymer and a polymerizable monomer, and an aqueous-phase component, and emulsifying the resultant mixture.

The polymerizable monomer preferably has a molecular weight that is a weight-average molecular weight of 100 to 4000, more preferably 100 to 2000, still more preferably 100 to 1000, still more preferably 100 to 900, still more preferably 100 to 800, particularly preferably 150 to 750.

The weight-average molecular weight of the polymerizable monomer is a value measured by gel permeation chromatography (GPC). The GPC conditions are the same as those described above.

Photopolymerization Initiator

The specified particles may include at least one photopolymerization initiator.

When the specified particles have, as a polymerizable group, a photopolymerizable group (preferably a radical-polymerizable group) (in particular, when the specified particles include a photopolymerizable compound (more preferably a radical-polymerizable compound)), the specified particles preferably include at least one photopolymerization initiator.

When the specified particles include a photopolymerization initiator, the resultant image has higher sensitivity to an actinic energy ray, hence has higher hardness and higher adhesion to the substrate.

Specifically, when the specified particles include a photopolymerization initiator, each specified particle has both of a polymerizable group and a photopolymerization initiator. Thus, the polymerizable group and the photopolymerization initiator are in close proximity to each other, so that, compared with the cases of using existing photocurable compositions, the film has higher curing sensitivity (hereafter, also simply referred to as "sensitivity"). As a result, the resultant film has higher hardness and higher adhesion to the substrate.

When the specified particles include a photopolymerization initiator, photopolymerization initiators that have high sensitivity but have low dispersibility or low solubility in water and hence have been difficult to use become usable (for example, a photopolymerization initiator having a solubility of 1.0 mass % or less in water at 25° C.). As a result, photopolymerization initiators used can be selected with a higher degree of freedom, which results in an increase in the degree of freedom of selecting light sources used. This can provide higher curing sensitivity.

The above-described photopolymerization initiators that have high sensitivity but have low dispersibility or low solubility in water and hence have been difficult to use are, for example, specifically carbonyl compounds and acylphosphine oxide compounds described later, preferably acylphosphine oxide compounds.

In this way, in the ink according to the present disclosure, the specified particles are prepared so as to include a substance having a low solubility in water, so that the substance is contained in the ink according to the present disclosure, which is an aqueous composition. This is another advantage of the ink according to the present disclosure.

The ink according to the embodiment in which the specified particles include a photopolymerization initiator also has higher storage stability than existing photocurable compositions. The probable reason for this is that the photopolymerization initiator is included in the specified particles, to thereby suppress aggregation or sedimentation of the photopolymerization initiator.

The photopolymerization initiator that can be included in the specified particles may be appropriately selected from publicly known photopolymerization initiators.

The photopolymerization initiator is a compound that absorbs light (namely, an actinic energy ray) to generate a radical serving as a polymerization initiation species.

The photopolymerization initiator may be a publicly known compound. Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above-described compounds (a) to (m) may be used alone or in combination of two or more thereof.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-S61-194062A), acylphosphine sulfide described in JP1990-9597B (JP-H2-9597B), acylphosphine described in JP1990-9596B (JP-H2-9596B), thioxanthones described in JP1988-61950B (JP-S63-61950B), and coumarins described in JP1984-42864B (JP-S59-42864B).

Also preferred are polymerization initiators described in JP2008-105379A and JP2009-114290A.

Examples of commercially available products of the photopolymerization initiator include IRGACURE (registered trademark) 184, 369, 500, 651, 819, 907, 1000, 1300, 1700, 1870, DAROCUR (registered trademark) 1173, 2959, 4265, ITX, LUCIRIN (registered trademark) TPO [all manufactured by BASF], ESACURE (registered trademark) KTO37, KTO46, KIP150, EDB [all manufactured by Lamberti S.p.A.], H-Nu (registered trademark) 470, 470X [all manufactured by Spectra Group Limited], OMNIPOL TX, 9210 [all manufactured by IGM Resins B.V.], and SPEEDCURE 7005, 7010, and 7040 [all manufactured by LAMB SON Limited].

Among these photopolymerization initiators, more preferred are (a) carbonyl compounds or (b) acylphosphine oxide compounds; specific examples include bis(2,4,6-trimethylbenzoyl)-phenylphosphine oxide (such as IRGACURE (registered trademark) 819, manufactured by BASF), 2-(dimethylamine)-1-(4-morpholinophenyl)-2-benzyl-1-butanone (such as IRGACURE (registered trademark) 369, manufactured by BASF), 2-methyl-1-(4-methylthiophenyl)-2-morpholinopropan-1-one (such as IRGACURE (registered trademark) 907, manufactured by BASF), 1-hydroxy-cyclohexyl-phenyl-ketone (such as IRGACURE (registered trademark) 184, manufactured by BASF), and 2,4,6-trimethylbenzoyl-diphenyl-phosphine oxide (such as DAROCUR (registered trademark) TPO and LUCIRIN (registered trademark) TPO (both manufactured by BASF)).

Of these, from the viewpoint of, for example, higher sensitivity and suitability for LED light, the photopolymerization initiator internally included is preferably the (b) acylphosphine oxide compound, more preferably a monoacylphosphine oxide compound (particularly preferably, 2,4,6-trimethylbenzoyl-diphenyl-phosphine oxide), or a bisacylphosphine oxide compound (particularly preferably, bis(2,4,6-trimethylbenzoyl)-phenylphosphine oxide). The LED light preferably has a wavelength of 355 nm, 365 nm, 385 nm, 395 nm, or 405 nm.

Alternatively, from the viewpoint of suppression of migration, the photopolymerization initiator is preferably a polymeric photopolymerization initiator.

Examples of the polymeric photopolymerization initiator include the above-described Omnipol TX and 9210; and SPEEDCURE 7005, 7010, and 7040.

The specified particles including a photopolymerization initiator can be produced by, for example, mixing an oil-phase component including a specified chain polymer and a photopolymerization initiator, and an aqueous-phase component, and emulsifying the resultant mixture.

The photopolymerization initiator content relative to the solid-content amount of the specified particles is preferably 0.1 mass % to 25 mass %, more preferably 0.5 mass % to 20 mass %, still more preferably 1 mass % to 15 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator caused by irradiation with an actinic energy ray can be further promoted.

The sensitizer is a substance that absorbs a specific actinic energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include compounds represented by General formula (i) in JP2010-24276A, and compounds represented by General formula (I) in JP1994-107718A (JP-H6-107718A).

Of these, from the viewpoint of suitability for LED light and reactivity to a photopolymerization initiator, the sensitizer is preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, such sensitizers may be included alone or in combination of two or more thereof.

When the specified particles include a sensitizer, the sensitizer content relative to the solid-content amount of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, mixing an oil-phase component including a specified chain polymer, a photopolymerization initiator, and a sensitizer, and an aqueous-phase component, and emulsifying the resultant mixture.

Photothermal Conversion Agent

When the specified particles include, as a polymerizable compound, a thermal-polymerizable compound (preferably a thermal-polymerizable monomer), the specified particles may include at least one photothermal conversion agent.

The photothermal conversion agent is a compound that absorbs infrared radiation or the like to generate heat, to polymerize and cure a thermal-polymerizable compound. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

The specified particles including a photothermal conversion agent can be produced by, for example, mixing an oil-phase component including a specified chain polymer and a photothermal conversion agent, and an aqueous-phase component, and emulsifying the resultant mixture.

Such photothermal conversion agents may be used alone or in combination of two or more thereof.

The photothermal conversion agent content relative to the solid-content amount of the specified particles is preferably 0.1 mass % to 25 mass %, more preferably 0.5 mass % to 20 mass %, still more preferably 1 mass % to 15 mass %.

Thermal Curing Accelerator

When the specified particles include, as the polymerizable compound, a thermal-polymerizable compound (preferably a thermal-polymerizable monomer), the specified particles may include at least one thermal curing accelerator.

The thermal curing accelerator is a compound that catalytically promotes the thermosetting reaction of the thermal-polymerizable compound (preferably a thermal-polymerizable monomer).

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole (such as phenylimidazole or 2-methylimidazole), and pyrazole.

The specified particles including a thermal curing accelerator can be produced by, for example, mixing an oil-phase component including a specified chain polymer and a thermal curing accelerator, and an aqueous-phase component, and emulsifying the resultant mixture.

Such thermal curing accelerators may be used alone or in combination of two or more thereof.

The thermal curing accelerator content relative to the solid-content amount of the specified particles is preferably 0.1 mass % to 25 mass %, more preferably 0.5 mass % to 20 mass %, still more preferably 1 mass % to 15 mass %.

In the ink according to the present disclosure, the solid-content amount of the specified particles relative to the solid-content amount of the ink is preferably 50 mass % or more, more preferably 60 mass % or more, still more preferably 70 mass % or more, still more preferably 80 mass % or more, still more preferably 85 mass % or more.

This provides higher dispersion stability and higher adhesion between the image and the substrate.

In the ink according to the present disclosure, the solid-content amount of the specified particles relative to the total amount of the ink is preferably 1 mass % to 50 mass %, more preferably 3 mass % to 40 mass %, still more preferably 5 mass % to 30 mass %.

When the solid-content amount of the specified particles relative to the total amount of the ink is 1 mass % or more, higher adhesion between the image and the substrate is provided.

When the solid-content amount of the specified particles relative to the total amount of the ink is 50 mass % or less, the ink has higher dispersion stability.

The volume-average dispersed-particle size of the specified particles is not particularly limited, but is, from the viewpoint of dispersion stability, preferably 0.01 μm to 10.0 μm, more preferably 0.01 μm to 5 μm, still more preferably 0.05 μm to 1 μm, still more preferably 0.05 μm to 0.5 μm, still more preferably 0.05 μm to 0.3 μm.

In this Specification, the "volume-average dispersed-particle size" means a value measured by a light scattering method. The measurement of the volume-average dispersed-particle size of the specified particles by the light scattering method is performed with, for example, LA-960 (HORIBA, Ltd.).

Water

The ink according to the present disclosure contains water.

The water serves as a disperse medium of the specified particles (dispersoid).

The water content of the ink according to the present disclosure is not particularly limited. The water content relative to the total amount of the ink is preferably 10 mass % to 99 mass %, more preferably 20 mass % to 95 mass %, still more preferably 30 mass % to 90 mass %, particularly preferably 50 mass % to 90 mass %.

Coloring Material

The ink according to the present disclosure may be an ink containing at least one coloring material (what is called "color ink"), or may be an ink not containing any coloring material (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes. Of these, more preferably, pigments are included because of high weather resistance and high color reproducibility.

The pigments are not particularly limited, and may be appropriately selected in accordance with the purpose. Examples of the pigments include publicly known organic pigments and inorganic pigments. Other examples of the pigments include resin particles dyed with dyes, commercially available pigment dispersions, and surface-treated pigments (such as a pigment dispersed in a dispersion medium such as water, a liquid compound, or an insoluble resin, and a pigment surface-treated with, for example, a resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used.

When a pigment is used as the coloring material, the pigment may be a self-dispersible pigment in which the surfaces of pigment particles have a hydrophilic group.

For the coloring materials and the pigment dispersing agent, reference may be appropriately made to Paragraphs 0180 to 0200 of JP2014-040529A and Paragraphs 0122 to 0129 of WO2016/052053A.

When the ink according to the present disclosure contains a coloring material, the coloring material content relative to the total amount of the ink is preferably 0.1 mass % to 20 mass %, more preferably 0.5 mass % to 10 mass %, particularly preferably 0.5 mass % to 5 mass %.

Other Components

The ink according to the present disclosure may contain, as needed, other components different from the above-described components.

Such other components may be included in the specified particles, or may not be included in the specified particles.

Organic Solvent

The ink according to the present disclosure may contain an organic solvent.

When the ink according to the present disclosure contains an organic solvent, higher adhesion between the image and the substrate can be provided.

When the ink according to the present disclosure contains an organic solvent, the organic solvent content relative to the total amount of the ink is preferably 0.1 mass % to 10 mass %, more preferably 0.1 mass % to 5 mass %.

Specific examples of the organic solvent are as follows:

alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (such as formamide, N,N-dimethylformamide, and N,N-dimethylacetamide), heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The ink according to the present disclosure may contain at least one surfactant.

When the ink according to the present disclosure contains a surfactant, the ink exhibits higher wettability to the substrate.

Examples of the surfactant include higher fatty acid salt, alkyl sulfate, alkyl ester sulfate, alkyl sulfonate, alkylbenzene sulfonate, sulfosuccinate, naphthalenesulfonate, alkyl phosphate, polyoxyalkylene alkyl ether phosphate, polyoxyalkylene alkyl phenyl ether, polyoxyethylene polyoxypropylene glycol, glycerol ester, sorbitan ester, polyoxyethylene fatty acid amide, and amine oxide.

Of these, the surfactant is preferably at least one surfactant selected from the group consisting of alkyl sulfate, alkyl sulfonate, and alkylbenzene sulfonate, particularly preferably alkyl sulfate.

The surfactant is, from the viewpoint of dispersibility of the specified particles, preferably an alkyl sulfate having an alkyl chain length of 8 to 18, more preferably at least one selected from the group consisting of sodium dodecyl sulfate (SDS, alkyl chain length: 12) and sodium cetyl sulfate (SCS, alkyl chain length: 16).

In addition to the above-described surfactants, there are other surfactants including those described in JP1987-173463A (JP-S62-173463A) and JP1987-183457A (JP-S62-183457A). Examples of the other surfactants include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds.

The fluoroorganic compounds are preferably hydrophobic. The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

Incidentally, the ink according to the present disclosure may substantially contain no surfactants (for example, anionic surfactants).

Herein, "contain substantially no" means that the content relative to the total amount of the ink is less than 1 mass % (preferably less than 0.1 mass %).

The embodiment in which the ink contains substantially no anionic surfactant has an advantage of suppressing foaming of the ink, an advantage of providing an image having higher water resistance, and an advantage of suppressing post-formation blushing of an image due to bleed out, for example. In particular, in the case of using, for preparation of the ink, a pigment dispersion having an anionic dispersible group, there is also the following advantage: degradation of dispersibility of the pigment is suppressed, the degradation being caused because an anionic surfactant causes an increase in the ion concentration of the system to cause a decrease in the degree of electrolytic dissociation of the anionic pigment dispersing agent.

Polymerization Inhibitor

The ink according to the present disclosure may contain a polymerization inhibitor.

When the ink according to the present disclosure contains a polymerization inhibitor, the ink can have higher storage stability.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron A1, and tris(N-nitroso-N-phenylhydroxylamine) aluminum salt.

Of these, preferred is at least one selected from the group consisting of p-methoxyphenol, catechols, quinones, alkylphenols, TEMPO, TEMPOL, cupferron A1, and tris(N-nitroso-N-phenylhydroxylamine) aluminum salt; more preferred is at least one selected from the group consisting of p-methoxyphenol, hydroquinone, benzoquinone, BHT, TEMPO, TEMPOL, cupferron A1, and tris(N-nitroso-N-phenylhydroxylamine) aluminum salt.

Ultraviolet Absorbent

The ink according to the present disclosure may contain an ultraviolet absorbent.

When the ink according to the present disclosure contains an ultraviolet absorbent, it provides an image having higher weather resistance, for example.

Examples of the ultraviolet absorbent include publicly known ultraviolet absorbents such as benzotriazole-based compounds, benzophenone-based compounds, triazine-based compounds, and benzoxazole-based compounds.

The ink according to the present disclosure may optionally contain, from the viewpoint of hardness of the image, adhesion between the image and the substrate, and control of ink ejection stability, outside of the specified particles, a polymerizable compound, a photopolymerization initiator, and a resin, for example.

These components preferably have water-solubility or water-dispersibility.

Herein, the "water-solubility" is a property in which such a component having been dried at 105° C. for 2 hours has a solubility of more than 1 g in 100 g of distilled water at 25° C.

The "water-dispersibility" is a property in which such a component is water-insoluble and is dispersed in water. This term "water-insoluble" is a property in which such a component having been dried at 105° C. for 2 hours has a solubility of 1 g or less in 100 g of distilled water at 25° C.

The phrase "ink contains a polymerizable compound outside of the specified particles" means that the ink contains a polymerizable compound not included in the specified particles. The same applies to a photopolymerization initiator, a water-soluble resin, a water-dispersible resin, or the like contained outside of the specified particles.

Examples of the polymerizable compound that can be contained outside of the specified particles include polymerizable compounds described in Paragraphs 0148 to 0156 of WO2016/052053A.

Examples of the polymerizable compound that can be contained outside of the specified particles include radical-polymerizable compounds such as a compound having an ethylenically unsaturated group, acrylonitrile, styrene, unsaturated polyester, unsaturated polyether, unsaturated polyamide, and unsaturated urethane.

Of these, the polymerizable compound that can be contained outside of the specified particles is preferably a compound having an ethylenically unsaturated group, particularly preferably a compound having a (meth)acryloyl group.

From the viewpoint of water-solubility or water-dispersibility, the polymerizable compound that can be contained outside of the specified particles is, for example, preferably at least one selected from the group consisting of (meth) acrylic acid, sodium (meth)acrylate, potassium (meth)acrylate, N,N-dimethylacrylamide, N,N-diethylacrylamide, morpholineacrylamide, N-2-hydroxyethyl(meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer); more preferably, at least one selected from the group consisting of (meth)acrylic acid, N,N-dimethylacrylamide, N-2-hydroxyethyl(meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer).

General formula (a)

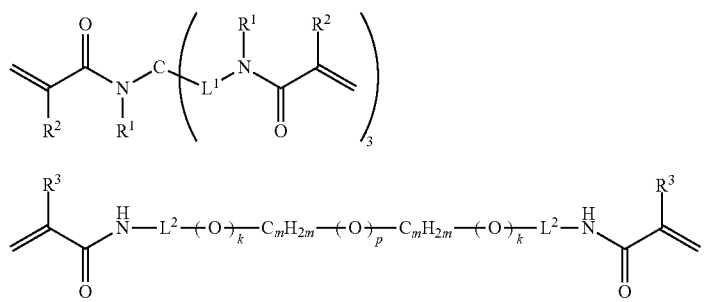

General formula (b)

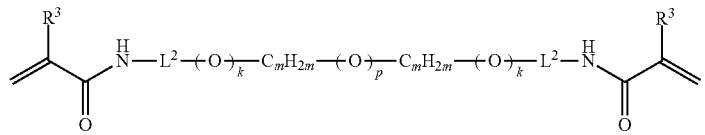

General formula (c)

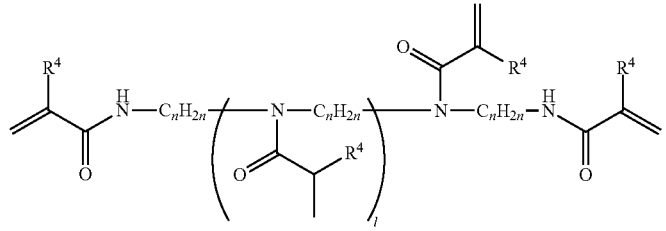

General formula (d)

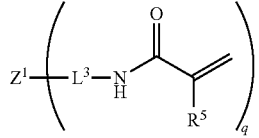

outside of the specified particles is preferably a compound having at least one selected from the group consisting of an amide structure, a polyethylene glycol structure, a polypropylene glycol structure, a carboxyl group, and a salt of a carboxy group.

From the viewpoint of water-solubility or water-dispersibility, the polymerizable compound that can be contained In General formula (a), the plurality of R's each independently represent a hydrogen atom, an alkyl group, an aryl group, or a heterocyclic group; the plurality of $R^2$'s each independently represent a hydrogen atom or a methyl group; and the plurality of $L^1$'s each independently represent a single bond or a divalent linking group.

In General formula (b), the plurality of $R^3$'s each independently represent a hydrogen atom or a methyl group; the plurality of $L^2$'s each independently represent an alkylene group having 1 to 8 carbon atoms; the plurality of k's and p each independently represent 0 or 1; the plurality of m's each independently represent an integer of 0 to 8; however, at least one of k's or p is 1.

In General formula (c), the plurality of $R^4$'s each independently represent a hydrogen atom or a methyl group; the plurality of n's each independently represent an integer of 1 to 8; and l represents an integer of 0 or 1.

In General formula (d), $Z^1$ represents a residue of polyol in which q hydrogen atoms have been removed from the hydroxyl groups; q represents an integer of 3 to 6; the plurality of $R^5$'s each independently represent a hydrogen atom or a methyl group; and the plurality of $L^3$'s each independently represent an alkylene group having 1 to 8 carbon atoms.

Specific examples of compounds represented by General formula (a) to General formula (d) include compounds represented by the following AM-1 to AM-4.

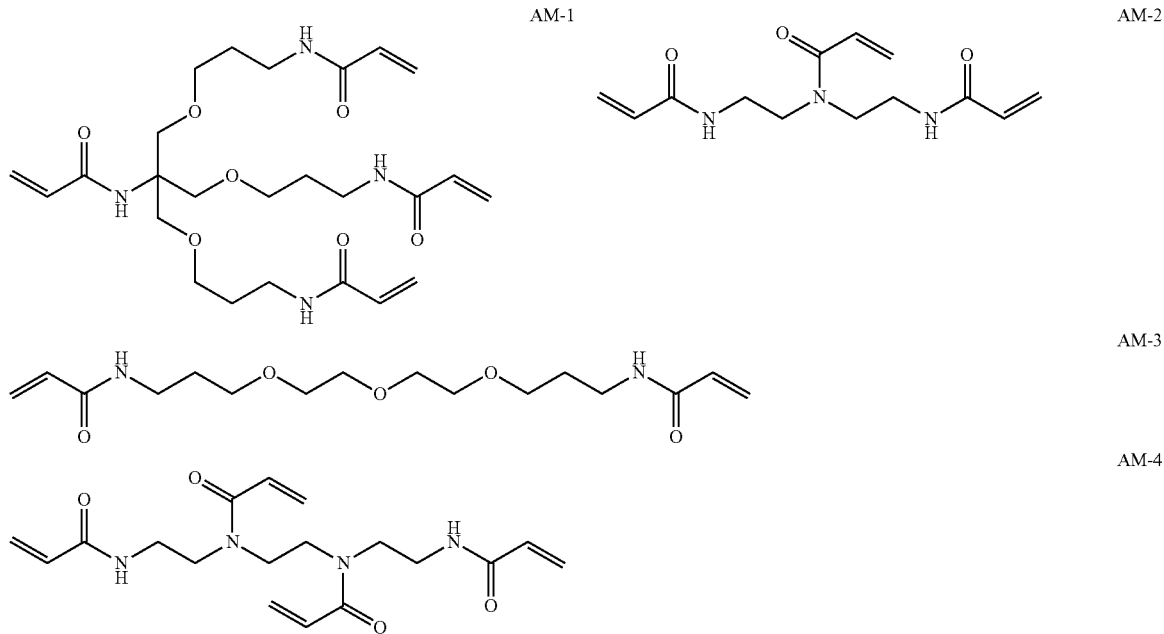

AM-1 to AM-4 above can be synthesized by the method described in JP5591858B.

Regarding the photopolymerization initiator and the resin that can be contained outside of the specified resin, reference can be appropriately made to Paragraphs 0139 to 0147 and 0157 in WO2016/052053A.

Preferred Properties of Ink

When the ink according to the present disclosure is set at 25° C. to 50° C., the ink preferably has a viscosity of 3 mPa·s to 15 mPa·s, more preferably 3 mPa·s to 13 mPa·s. In particular, when the ink according to the present disclosure is set at 25° C., the ink preferably has a viscosity of 50 mPa·s or less. When the viscosity of the ink satisfies such a range, higher ejection stability can be achieved.

Incidentally, the viscosity of the ink is a value measured with a viscometer (VISCOMETER TV-22, Toki Sangyo Co., Ltd.).

Specific Example 1 of Method for Producing Ink (Production Method A)

The method for producing the ink according to the present disclosure is not particularly limited, but is preferably the following Production method A.

The Production method A has a step of mixing an oil-phase component including an organic solvent, a specified hydrophobic compound, a specified polymer, and a polymerizable compound, or an oil-phase component including an organic solvent, a specified hydrophobic compound, a tri- or higher functional isocyanate compound, and a polymerizable compound, and an aqueous-phase component including water, and performing emulsification to thereby form specified particles.

This Production method A enables production of an ink for forming an image having high scratch resistance.

This Production method A facilitates production of an ink according to an embodiment in which the specified hydrophobic compound is included in the specified particles.

In the step of forming the specified particles, the above-described oil-phase component and the aqueous-phase component are mixed and the resultant mixture is emulsified to thereby form the specified particles. The formed specified particles function as a dispersoid in the ink produced.

Water in the aqueous-phase component functions as a disperse medium in the ink produced.

Examples of the organic solvent included in the oil-phase component include ethyl acetate and methyl ethyl ketone.

The organic solvent is preferably at least partially removed during formation of the specified particles or after formation of the specified particles.

The oil-phase component may include, in addition to the above-described components, for example, a photopolymerization initiator, a sensitizer, a polymerizable-group-introducing compound (preferably, a compound having a polymerizable group and an active hydrogen group), a polymerizable-group-introduced isocyanate compound, and a hydrophilic-group-introduced isocyanate compound.

The aqueous-phase component is not particularly limited as long as it includes water, and may be water alone.

The aqueous-phase component may include, in addition to water, another component.

For example, the aqueous-phase component may include a hydrophilic-group-introducing compound (preferably a compound having a hydrophilic group and an active hydrogen group).

The aqueous-phase component may contain, as a neutralizer for an unneutralized anionic group (such as a carboxy group, a sulfo group, a phosphoric acid group, a phosphonic acid group, or a sulfuric acid group), a basic compound. This enables, during formation of the specified particles, formation of a neutralized anionic group (specifically, an anionic group in the form of salt such as a salt of a carboxy group, a salt of a sulfo group, a salt of a phosphoric acid group, a salt of a phosphonic acid group, or a salt of a sulfuric acid group).

When the basic compound (neutralizer) is used, the basic compound (neutralizer) is preferably contained at least in the aqueous-phase component.

Examples of the basic compound include inorganic bases such as sodium hydroxide and potassium hydroxide, and organic bases such as triethylamine. Of these, preferred basic compounds are inorganic bases such as sodium hydroxide and potassium hydroxide.

Examples of the salt of the anionic group in the form of salt include alkali metal salts such as sodium salts and potassium salts; and organic amine salts such as triethylamine salts. Of these, preferred salts of the anionic group in the form of salt are alkali metal salts such as sodium salts and potassium salts.

In the Production method A, the total amount of the oil-phase component and the aqueous-phase component except for the organic solvent and water corresponds to the solid-content amount of the specified particles in the ink produced.

Regarding preferred ranges of the amounts of components used for the Production method A, reference can be made to the above-described section "Ink". This reference is made such that, in the section "Ink", "content" and "the solid-content amount of the specified particles" are respectively replaced by "usage amount" and "total amount of the oil-phase component and the aqueous-phase component except for the organic solvent and water".

In the step of forming the specified particles, the method of mixing the oil-phase component and the aqueous-phase component is not particularly limited, but is, for example, mixing by stirring.

In the step of forming the specified particles, the method of performing emulsification is not particularly limited, but is, for example, emulsification using an emulsification device such as a homogenizer (for example, a dispersing device).

In the emulsification, the number of revolutions in the dispersing device is, for example, 5,000 rpm to 20,000 rpm, preferably 10,000 rpm to 15,000 rpm.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of forming the specified particles, emulsification may be performed under heating.

The emulsification under heating enables more efficient formation of the specified particles.

In addition, the emulsification under heating facilitates, from the mixture, removal of at least a portion of the organic solvent in the oil-phase component.

The heating temperature in the case of emulsification under heating is preferably 35° C. to 70° C., more preferably 40° C. to 60° C.

The step of forming the specified particles may include an emulsification stage of emulsifying the mixture (at a temperature of less than 35° C., for example), and a heating stage of heating (at a temperature of 35° C. or more, for example) the emulsion obtained by the emulsification stage.

Such an embodiment including the emulsification stage and the heating stage enables, particularly in the heating stage, more efficient formation of the specified particles.

In addition, the embodiment including the emulsification stage and the heating stage facilitates, particularly in the heating stage, removal, from the mixture, at least a portion of the organic solvent in the oil-phase component.

The heating temperature in the heating stage is preferably 35° C. to 70° C., more preferably 40° C. to 60° C.

In the heating stage, the heating time is preferably 6 hours to 50 hours, more preferably 12 hours to 40 hours, still more preferably 15 hours to 35 hours.

The Production method A may have, in addition to the step of forming the specified particles, another step as needed.

The other step may be a step of adding other components (such as a pigment) after the step of forming the specified particles.

The other components (such as a pigment) added are the same as the above-described other components that can be contained in the ink.

Specific Example 2 of Method for Producing Ink
(Production Method B)

Another method for producing the ink according to the present disclosure may be the following Production method B.

The Production method B has:

a step of mixing an oil-phase component including an organic solvent, a specified polymer, and a polymerizable compound, or an oil-phase component including an organic solvent, a tri- or higher functional isocyanate compound, and a polymerizable compound, and an aqueous-phase component including water, and performing emulsification, to obtain an aqueous dispersion including specified particles, and a step of adding a specified hydrophobic compound to the obtained aqueous dispersion.

In the addition step of the Production method B, to the aqueous dispersion, in addition to the specified hydrophobic compound, other components (such as a pigment) may be added.

This Production method B also enables production of an ink for forming an image having high scratch resistance.

This Production method B facilitates production of an ink according to an embodiment in which the specified hydrophobic compound is not included in the specified particles.

In the Production method B, the components that can be included in the oil-phase component and the aqueous-phase component are the same as the components that can be included in the oil-phase component and the aqueous-phase component in the Production method A.

The preferred conditions of the Production method B are also the same as the preferred conditions of the Production method A.

Image-Forming Method

An image-forming method according to the present disclosure has a step of applying, onto a substrate, the above-described ink according to the present disclosure (hereafter, also referred to as "application step"), and a step of curing the ink composition applied onto the substrate (hereafter, also referred to as "curing step").

The image-forming method according to the present disclosure may optionally have another step.

The image-forming method according to the present disclosure forms an image having high scratch resistance on the substrate.

Application Step

The application step is a step of applying the ink according to the present disclosure onto a substrate.

The mode of applying the ink onto the substrate may be any one of modes using publicly known processes such as a coating process, an immersion process, or an ink jet process. In particular, the ink jet process is preferred because it enables formation of films (such as images) on various substrates (including recording media).

The substrate is not particularly limited and may be appropriately selected from, for example, publicly known substrates provided as support bodies and recording media.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the substrate include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers. The textile substrates may be textile substrates described in Paragraphs 0039 to 0042 of WO2015/158592A.

Preferred examples of the substrate include plastic substrates such as polyvinyl chloride (PVC) substrates, polystyrene (PS) substrates, polycarbonate (PC) substrates, polyethylene terephthalate (PET) substrates, polypropylene (PP) substrates, and acrylic resin substrates.

The application of the ink by an ink jet process can be performed with a publicly known ink jet recording apparatus.

The ink jet recording apparatus is not particularly limited, and a publicly known ink jet recording apparatus that provides a target resolution can be freely selected and used.

Such an ink jet recording apparatus is, for example, an apparatus including an ink supply device, a temperature sensor, and heating means.

The ink supply device includes, for example, a source tank including the ink according to the present disclosure, supply pipes, an ink supply tank disposed immediately upstream of an ink jet head, a filter, and a piezo ink jet head. The piezo ink jet head may be operated so as to eject multisize dots of preferably 1 pl to 100 pl, more preferably 8 pl to 30 pl, at a resolution of preferably 320 dpi (dot per inch)×320 dpi to 4000 dpi×4000 dpi (dot per inch), more preferably 400 dpi×400 dpi to 1600 dpi×1600 dpi, still more preferably 720 dpi×720 dpi. Incidentally, "dpi" represents the number of dots for 2.54 cm (1 inch).

Curing Step

The curing step is a curing step of curing the ink applied onto the substrate.

This curing step causes a crosslinking reaction (namely, polymerization) of the specified particles to proceed, to thereby provide higher adhesion between the image and the substrate and higher hardness of the image.

The curing step is preferably, in the case of an ink including a photopolymerizable compound (and preferably a photopolymerization initiator), a curing step A of irradiation with an actinic energy ray (light); the curing step is preferably, in the case of an ink including a thermal-polymerizable compound, a curing step B of heating or irradiation with infrared radiation.

Curing Step A

The curing step A is a step of irradiating the ink applied onto the substrate, with an actinic energy ray.

In the curing step A, the ink applied onto the substrate is irradiated with an actinic energy ray, so that a photocrosslinking reaction (namely, photopolymerization) of the specified particles in the ink proceeds, to thereby provide higher adhesion between the image and the substrate, and higher hardness of the image.

Examples of the actinic energy ray usable in the curing step A include ultraviolet radiation (UV light), visible light, and an electronic beam. Of these, preferred is UV light.

The actinic energy ray (light) preferably has a peak wavelength of 200 nm to 405 nm, more preferably 220 nm to 390 nm, still more preferably 220 nm to 385 nm. The peak wavelength is also preferably 200 nm to 310 nm, also preferably 200 nm to 280 nm.

During the irradiation with an actinic energy ray (light), the illuminance at the exposed surface is, for example, 10 mW/cm$^2$ to 2000 mW/cm$^2$, preferably 20 mW/cm$^2$ to 1000 mW/cm$^2$.

During the irradiation with an actinic energy ray (light), the exposure energy is, for example, 10 mJ/cm$^2$ to 2000 mJ/cm$^2$, preferably 20 mJ/cm$^2$ to 1000 mJ/cm$^2$.

As sources for emitting an actinic energy ray (light), there are widely known sources such as a mercury lamp, a metal halide lamp, a UV fluorescent lamp, a gas laser, and a solid-state laser.

These light sources listed as examples may be replaced by semiconductor ultraviolet emission devices, which is industrially and environmentally advantageous.

Among semiconductor ultraviolet emission devices, LEDs (Light Emitting Diodes) and LDs (Laser Diodes), which are small, have long longevity and high efficiency, and are inexpensive, are considered as promising light sources.

Preferred light sources are a metal halide lamp, an ultrahigh pressure mercury lamp, a high pressure mercury lamp, a medium pressure mercury lamp, and a low pressure mercury lamp, an LED, and a blue-violet laser.

Of these, in the case of using a sensitizer and a photopolymerization initiator in combination, more preferred is an ultrahigh pressure mercury lamp that emits light at a wavelength of 365 nm, 405 nm, or 436 nm, a high pressure mercury lamp that emits light at a wavelength of 365 nm, 405 nm, or 436 nm, or an LED that emits light at a wavelength of 355 nm, 365 nm, 385 nm, 395 nm, or 405 nm; most preferred is an LED that emits light at a wavelength of 355 nm, 365 nm, 385 nm, 395 nm, or 405 nm.

In the curing step A, the time for irradiating the ink applied onto the substrate with an actinic energy ray is, for example, 0.01 seconds to 120 seconds, preferably 0.1 seconds to 90 seconds.

As the irradiation conditions and the basic irradiation method, the irradiation conditions and the irradiation method disclosed in JP1985-132767A (JP-S60-132767A) can be similarly used.

A preferred mode of irradiation with an actinic energy ray is specifically a mode in which both sides of a head unit including an ink ejection device are equipped with light sources, and the head unit and the light sources are used to perform scanning by, what is called, the shuttle mode; or a mode of irradiation with an actinic energy ray using another light source without being driven.

The irradiation with an actinic energy ray is preferably performed after the lapse of a certain time (for example, 0.01 seconds to 120 seconds, preferably 0.01 seconds to 60 seconds) from landing and heat-drying of the ink.

Curing Step B

The curing step B is a step of subjecting the ink applied onto the substrate to heating or irradiation with infrared radiation.

In the curing step B, the ink applied onto the substrate is subjected to heating or irradiation with infrared radiation to perform heat-curing, so that a thermal crosslinking reaction of the specified particles in the ink (namely, thermal polymerization) proceeds. This provides higher adhesion between the image and the substrate and higher hardness of the image.

The heating means for the heating is not particularly limited, and examples include a heating drum, hot air, an infrared lamp, an infrared LED, an infrared heater, a heating oven, a heating plate, an infrared laser, and an infrared dryer. Of these, from the viewpoint that the ink can be efficiently heat-cured, preferred are a light-emitting diode (LED) having a maximum absorption wavelength in the wavelengths of 0.8 μm to 1.5 μm or 2.0 μm to 3.5 μm and having emission wavelengths from near-infrared radiation to far-infrared radiation; a heater that radiates near-infrared radiation to far-infrared radiation; a laser having lasing wavelengths from near-infrared radiation to far-infrared radiation; and a dryer that radiates near-infrared radiation to far-infrared radiation.

The heating temperature during the heating is preferably 40° C. or more, more preferably 40° C. to 200° C., still more preferably 100° C. to 180° C. The heating temperature is the temperature of the ink composition on a substrate, and can be measured with a thermograph using an infrared thermography apparatus H2640 (manufactured by Nippon Avionics Co., Ltd.).

The heating time can be appropriately set in accordance with, for example, the heating temperature, the composition of the ink, and printing speed.

The Curing step B of causing heat-curing of the ink applied onto the substrate may also serve as the following heat-drying step.

Heat-Drying Step

The image-forming method may optionally further have a heat-drying step performed after the application step and before the curing step.

In the heat-drying step, the ink ejected onto the substrate is preferably treated with heating means to evaporate water and an organic solvent that is optionally used in combination, to fix the image.

The heating means is configured to dry at least water and an organic solvent that is optionally used in combination. The heating means is not particularly limited and, for example, heating using a heating drum, hot air, an infrared lamp, a heating oven, or a heating plate.

The heating temperature is preferably 40° C. or more, more preferably about 40° C. to about 150° C., still more preferably about 40° C. to about 80° C.

The heating time can be appropriately set in accordance with the composition of the ink and the printing speed.

The ink having been fixed by heating is optionally subjected to the curing step A in which the ink is irradiated with an actinic energy ray to thereby be further fixed by light. As described above, in the curing step A, fixing is preferably performed using UV light.

EXAMPLES

Hereinafter, the present invention will be specifically described with reference to Examples. However, the present invention is not limited to the following Examples. In the following description, "parts" mean parts by mass unless otherwise specified; "*" in chemical formulas represent bonding positions.

Example 1

Synthesis of Specified Polymer

In accordance with the following reaction scheme, the following Polymer 1 was synthesized as the specified polymer.

The following Polymer 1 has a structure in which a structure unit derived from IPDI (isophorone diisocyanate) and other structure units are bonded together to form urethane bonds.

Polymer 1

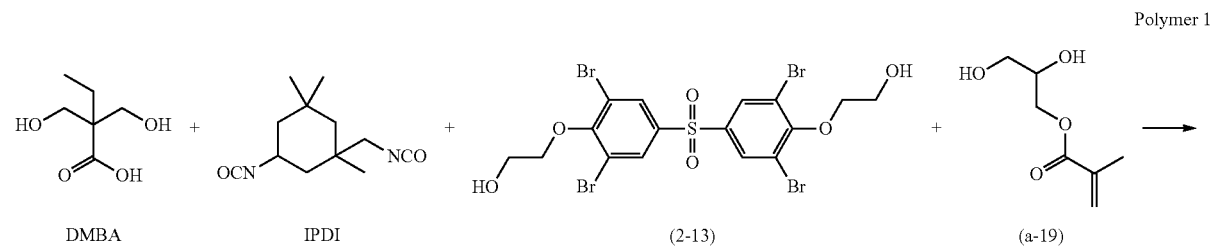

DMBA     IPDI     (2-13)     (a-19)

-continued

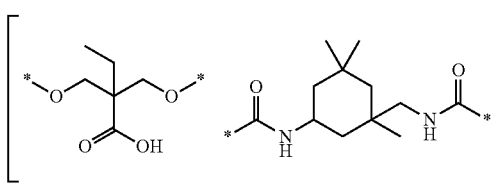 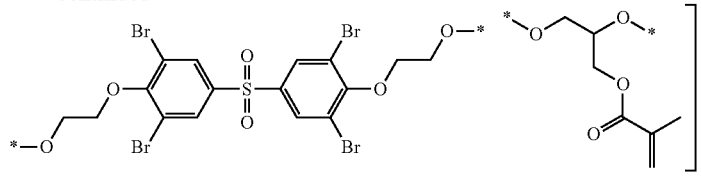

Into a three-neck flask, IPDI (47.8 g), DMBA (2,2-bis(hydroxymethyl)butyric acid) (9.1 g), Compound (2-13) (26.7 g), Compound (a-19) (16.4 g), and ethyl acetate (100 g) were charged and heated at 70° C. To this, 0.2 g of NEOSTANN U-600 (manufactured by Nitto Kasei Co., Ltd., inorganic bismuth catalyst; hereafter, also referred to as "U-600") was added and stirred at 70° C. for 15 hours.

Subsequently, to this, isopropyl alcohol (70.0 g) and ethyl acetate (63.3 g) were added, and stirred at 70° C. for 3 hours. After stirring for 3 hours, the reaction solution was left to cool to room temperature, and subsequently subjected to adjustment of the concentration using ethyl acetate to thereby obtain a 30 mass % solution of Polymer 1 (the solvent was a mixed solution of ethyl acetate/isopropyl alcohol).

Polymer 1 was found to have a weight-average molecular weight (Mw) of 20000.

Preparation of Aqueous Dispersion
Preparation of Oil-Phase Component
  Ethyl Acetate,
  the 30 mass % solution of Polymer 1 (the amount of Polymer 1 was 53 parts by mass),
  a polymerizable compound SR833S manufactured by Sartomer (20.5 parts by mass; hereafter also referred to as "S833"),
  a polymerizable compound SR399E manufactured by Sartomer (22 parts by mass; hereafter, also referred to as "S399"),
  a photopolymerization initiator IRGACURE (registered trademark) 819 manufactured by BASF (2.5 parts by mass; hereafter, also referred to as "IRG819"),
  as a sensitizer, 2-isopropylthioxanthone manufactured by Tokyo Chemical Industry Co., Ltd. (0.5 parts by mass; hereafter, also referred to as "ITX"), and
  as a specified hydrophobic compound, 1-eicosanol (1.5 parts by mass),
were mixed and stirred for 15 minutes, to obtain 45.7 g of an oil-phase component having a solid content of 30 mass %.

S833 is a bifunctional polymerizable compound having a cyclic structure (polymerizable monomer), specifically tricyclodecanedimethanol diacrylate.

S399 is a pentafunctional polymerizable compound not having any cyclic structure (polymerizable monomer), specifically dipentaerythritol pentaacrylate.

IRG819 is an acylphosphine oxide-based photopolymerization initiator, specifically bis(2,4,6-trimethylbenzoyl)-phenylphosphine oxide.

Preparation of Aqueous-Phase Component
  Distilled water (43.1 g) and sodium hydroxide serving as a neutralizer were mixed and stirred for 15 minutes, to prepare an aqueous-phase component.

The amount of sodium hydroxide used as a neutralizer was adjusted such that the particles to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(Polymer 1 content relative to total solid-content amount of oil-phase component (mass %)/100)×Acid value of Polymer 1 (mmol/g)×0.9×Molecular weight of sodium hydroxide (g/mol)/1000

The acid value of Polymer 1 (mmol/g) is the number of millimoles of carboxy groups included in a mass of 1 g of Polymer 1. Polymer 1 has an acid value (mmol/g) of 0.61 mmol/g.

The oil-phase component and the aqueous-phase component were mixed, and the resultant mixture was emulsified at room temperature with a homogenizer at 12000 rpm for 10 minutes, to obtain an emulsion. The obtained emulsion was added to distilled water (15.3 g). The resultant liquid was heated at 50° C., and stirred at 50° C. for 5 hours, to drive off ethyl acetate from the liquid.

The liquid from which ethyl acetate had been driven off was diluted with distilled water such that the solid-content amount became 20 mass %, to obtain an aqueous dispersion of specified particles.

Preparation of Ink
Components were mixed so as to satisfy the following composition to prepare an ink.
Composition of Ink
  The above-described aqueous dispersion: 82 parts
  Pigment dispersion liquid (Pro-jet Cyan APD1000 (manufactured by FUJIFILM Imaging Colorants, Inc.), pigment concentration: 14 mass %): 13 parts
  Fluorosurfactant (manufactured by E. I. du Pont de Nemours and Company, Capstone FS-31, solid content: 25 mass %): 0.3 parts
  2-Methylpropanediol: 4.7 parts
Evaluations
The ink obtained above was evaluated as described below.
The results are described in Table 1-2.
Hardness of Cured Film (Pencil Hardness)
The ink stored at room temperature within 1 day from preparation was applied onto a substrate, to form, on the substrate, a coating film having a thickness of 12 μm.

The substrate employed was a polypropylene substrate CORREX, manufactured by DUROplastic Technologies.

The application was performed using a K Hand Coater, the No. 2 bar of the K Hand Coater, manufactured by RK PRINT COAT INSTRUMENTS LTD.

Subsequently, the coating film was dried at 60° C. for 3 minutes.

The dried coating film was irradiated with ultraviolet radiation (UV) to cure the coating film. Thus, a cured film was obtained.

The irradiation with ultraviolet radiation (UV) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 1.0 W/cm². This irradiation with UV was performed at an exposure energy of 1000 mJ/cm².

The cured film was measured in terms of pencil hardness in accordance with JIS K5600-5-4 (1999).

The pencil employed for the measurement of pencil hardness was UNI (registered trademark) manufactured by Mitsubishi Pencil Co., Ltd.

Scratch Resistance of Cured Film

A cured film formed as in the evaluation of pencil hardness was subjected to a scratch test under the following conditions.

Conditions of Scratch Test
Test standard: ISO1518 (JIS K 5600)
Instrument: Reciprocating Abraser "Model 5900", manufactured by Taber Industries
Scratch jig: TABER scratch test 0.50 mm Scratch Tip
Load: 2 N
Scratching speed: 35 mm/s
Number of scratching performed: 5 strokes After the scratch test was performed, the state of the cured film becoming scratched was visually observed, and the scratch resistance of the cured film was evaluated in accordance with the following evaluation grades.

Among the following evaluation grades, A represents the highest scratch resistance of cured films.

Evaluation Grades of Scratch Resistance of Cured Film
A: No marks were left in the cured film.
B: A mark was left in the cured film, but the cured film did not chip.
C: The surface of the cured film chipped, but the surface of the substrate was not exposed.
D: The surface of the cured film chipped and the surface of the substrate was exposed.

Ink Ejection Stability

The ink stored at room temperature within 1 day from preparation was ejected through the head of an ink jet printer (manufactured by Roland DG Corporation, SP-300V) for 30 minutes, and then the ejection was terminated.

After 10 minutes elapsed from the termination of ejection, the ink was again ejected through the head onto the substrate to form a 5 cm×5 cm solid image.

Such images were visually inspected for missing dots due to, for example, nozzles turned into a non-ejection state, and ink ejection stability was evaluated in accordance with the following evaluation grades.

Among the following evaluation grades, A represents the highest ink ejection stability.

Evaluation Grades of Ejection Stability
A: No missing dots due to, for example, nozzles turned into a non-ejection state were found and good images were obtained.
B: A few missing dots due to, for example, nozzles turned into a non-ejection state were found, but they did not affect the practical use.

C: Missing dots due to, for example, nozzles turned into a non-ejection state were found and the images were not practically usable.

Examples 2 to 7 and 9 to 13

The same procedures as in Example 1 were performed except for changes in the species of the specified hydrophobic compound, the amount of the specified hydrophobic compound, and the combination of the amounts of polymerizable compounds as described in Tables 1-1 and 1-2.

The results are described in Table 1-2.

Example 8

The same procedures as in Example 1 were performed except for the following changes.

The results are described in Table 1-2.

Changes from Example 1

In the Preparation of aqueous dispersion, the specified hydrophobic compound was not used.

In the Preparation of ink, the composition of ink further includes a specified hydrophobic compound (1-eicosanol) contained in an amount of 1.50 mass % relative to the total solid-content amount of the specified particles.

The amount of aqueous dispersion was adjusted such that the total amount of the composition of the ink became 100 parts.

Comparative Examples 1 and 2

The same procedures as in Example 1 were performed except that the specified hydrophobic compound was changed to a comparative compound (1-hexanol or 1-butanol) described in Table 1-2.

The results are described in Table 1-2.

Comparative Example 3

The same procedures as in Example 1 were performed except that, in the Preparation of aqueous dispersion, the specified hydrophobic compound was not used, and the amount of polymerizable compound (S833) was changed as described in Table 1-1.

The results are described in Table 1-2.

Example 101

Synthesis of Specified Polymer

In accordance with the following reaction scheme, the following Polymer 2 was synthesized as the specified polymer.

The following Polymer 2 has a structure in which a structure unit derived from IPDI and other structure units are bonded together to form urethane bonds.

Polymer 2

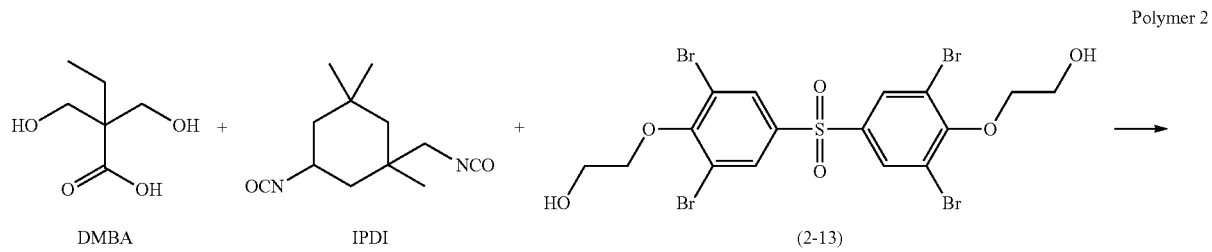

DMBA        IPDI        (2-13)

-continued

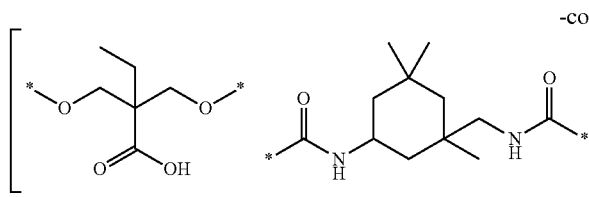 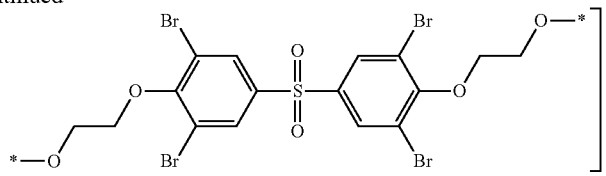

To a three-neck flask, IPDI (34.5 g), DMBA (9.1 g), Compound (2-13) (56.4 g), and ethyl acetate (100 g) were charged, and heated at 70° C. To this, 0.2 g of NEOSTANN U-600 (manufactured by Nitto Kasei Co., Ltd., inorganic bismuth catalyst; hereafter, also referred to as "U-600") was added, and stirred at 70° C. for 15 hours.

Subsequently, to this, isopropyl alcohol (70.0 g) and ethyl acetate (63.3 g) were added, and stirred at 70° C. for 3 hours. After the stirring for 3 hours, the reaction solution was left to cool to room temperature, and subsequently subjected to adjustment of the concentration using ethyl acetate to thereby obtain a 30 mass % solution of Polymer 2 (the solvent was a mixed solution of ethyl acetate/isopropyl alcohol).

Polymer 2 was found to have a weight-average molecular weight (Mw) of 20000.

Preparation of Aqueous Dispersion, Preparation of Ink, and Evaluations

The same procedures as in Example 1 were performed except that S833, S399, IRG819, and ITX were changed to Trixene™ BI 7982 (thermal-polymerizable monomer; blocked isocyanate; Baxenden Chemicals Limited) (hereafter, also referred to as "B7982"; the amount is described in Table 1-1) from which propylene glycol monomethyl ether was driven off under a reduced pressure under conditions of 60° C. and 2.67 kPa (20 torr), and Polymer 1 was changed to Polymer 2 in the same amount as that of Polymer 1.

The results are described in Table 1-2.

Example 102

The same procedures as in Example 101 were performed except that B7982 was changed to EPICLON™ 840 (DIC Corporation; hereafter, also referred to as "E840"; the amount is described in Table 1-1) serving as a thermal-polymerizable oligomer having an epoxy group and 2-methylimidazole (hereafter, also referred to as "2MI"; the amount is described in Table 1-1) serving as a thermal curing accelerator.

The results are described in Table 1-1.

Examples 103 to 106

The same procedures as in Example 101 were performed except that the species of the specified hydrophobic compound, the amount of the specified hydrophobic compound, and the combination of the amounts of polymerizable compounds were changed as described in Tables 1-1 and 1-2.

The results are described in Table 1-2.

Comparative Examples 101 and 102

The same procedures as in Example 101 were performed except that the specified hydrophobic compound was changed to a comparative compound (1-hexanol or 1-butanol) described in Table 1-2.

The results are described in Table 1-2.

In each of the above-described Examples 1 to 13 and 101 to 106 and Comparative Examples 1 to 3, 101, and 102, the aqueous dispersion of the specified particles was used for measurement of the volume-average dispersed-particle size of the specified particles.

As a result, in each of the Examples, the specified particles were found to have a volume-average dispersed-particle size in a range of 0.15 µm to 0.25 µm.

In each of the above-described Examples 1 to 13 and 101 to 106, the aqueous dispersion of the specified particles was used for measurement of the enclosure ratio of the hydrophobic compound in the specified particles.

As a result, in each of Examples 1 to 7, 9 to 13, and 101 to 106, the enclosure ratio in the specified particles was found to be 99 mass % or more, which demonstrated that the specified hydrophobic compound was included in the specified particles.

In Example 8, the enclosure ratio in the specified particles was found to be 0 mass %, which demonstrated that the specified hydrophobic compound was not included in the specified particles.

TABLE 1-1

| | Total solid content of particles (amounts are described in parts by mass) | | | | | | | | | |
|---|---|---|---|---|---|---|---|---|---|---|
| | Polymer | | Polymerizable compound | | Polymerizable compound | | Photopolymerization initiator or thermal curing accelerator | | Sensitizer | |
| | Species | Amount | Species | Amount | Species | Amount | Species | Amount | Species | Amount |
| Example 1 | Polymer 1 | 53 | S833 | 20.5 | S399 | 22.0 | IRG819 | 2.5 | ITX | 0.5 |
| Example 2 | Polymer 1 | 53 | S833 | 20.5 | S399 | 22.0 | IRG819 | 2.5 | ITX | 0.5 |
| Example 3 | Polymer 1 | 53 | S833 | 20.5 | S399 | 22.0 | IRG819 | 2.5 | ITX | 0.5 |
| Example 4 | Polymer 1 | 53 | S833 | 20.0 | S399 | 22.0 | IRG819 | 2.5 | ITX | 0.5 |
| Example 5 | Polymer 1 | 53 | S833 | 20.5 | S399 | 22.0 | IRG819 | 2.5 | ITX | 0.5 |
| Example 6 | Polymer 1 | 53 | S833 | 20.5 | S399 | 22.0 | IRG819 | 2.5 | ITX | 0.5 |
| Example 7 | Polymer 1 | 53 | S833 | 20.5 | S399 | 22.0 | IRG819 | 2.5 | ITX | 0.5 |
| Example 8 | Polymer 1 | 53 | S833 | 20.5 | S399 | 22.0 | IRG819 | 2.5 | ITX | 0.5 |
| Example 9 | Polymer 1 | 53 | S833 | 21.7 | S399 | 22.0 | IRG819 | 2.5 | ITX | 0.5 |
| Example 10 | Polymer 1 | 53 | S833 | 21.3 | S399 | 22.0 | IRG819 | 2.5 | ITX | 0.5 |
| Example 11 | Polymer 1 | 53 | S833 | 21.0 | S399 | 22.0 | IRG819 | 2.5 | ITX | 0.5 |

TABLE 1-1-continued

| | Polymer | | Polymerizable compound | | Polymerizable compound | | Photopolymerization initiator or thermal curing accelerator | | Sensitizer | |
|---|---|---|---|---|---|---|---|---|---|---|
| | Species | Amount | Species | Amount | Species | Amount | Species | Amount | Species | Amount |
| Example 12 | Polymer 1 | 53 | S833 | 20.0 | S399 | 22.0 | IRG819 | 2.5 | ITX | 0.5 |
| Example 13 | Polymer 1 | 53 | S833 | 17.0 | S399 | 22.0 | IRG819 | 2.5 | ITX | 0.5 |
| Comparative Example 1 | Polymer 1 | 53 | S833 | 20.5 | S399 | 22.0 | IRG819 | 2.5 | ITX | 0.5 |
| Comparative Example 2 | Polymer 1 | 53 | S833 | 20.5 | S399 | 22.0 | IRG819 | 2.5 | ITX | 0.5 |
| Comparative Example 3 | Polymer 1 | 53 | S833 | 22.0 | S399 | 22.0 | IRG819 | 2.5 | ITX | 0.5 |
| Example 101 | Polymer 2 | 53 | B7982 | 45.5 | — | — | — | — | — | — |
| Example 102 | Polymer 2 | 53 | E840 | 41.5 | — | — | 2MI | 4 | — | — |
| Example 103 | Polymer 2 | 53 | B7982 | 45.0 | — | — | — | — | — | — |
| Example 104 | Polymer 2 | 53 | B7982 | 45.5 | — | — | — | — | — | — |
| Example 105 | Polymer 2 | 53 | B7982 | 45.5 | — | — | — | — | — | — |
| Example 106 | Polymer 2 | 53 | B7982 | 45.5 | — | — | — | — | — | — |
| Comparative Example 101 | Polymer 2 | 53 | B7982 | 45.5 | — | — | — | — | — | — |
| Comparative Example 102 | Polymer 2 | 53 | B7982 | 45.5 | — | — | — | — | — | — |

TABLE 1-2

Total solid content of particles (amounts are described in parts by mass)
Specified hydrophobic compound or comparative compound

| | Species | Amount | Solubility in water (mass %) | Classification | Melting point (° C.) | M | C | Alkyl group Classification | M | Content |
|---|---|---|---|---|---|---|---|---|---|---|
| Example 1 | 1-Eicosanol | 1.5 | <1 | Alcohol | 65 | 299 | 20 | Linear | 281 | 0.94 |
| Example 2 | 1-Docosanol | 1.5 | <1 | Alcohol | 70 | 327 | 22 | Linear | 309 | 0.95 |
| Example 3 | Stearyl alcohol | 1.5 | <1 | Alcohol | 58 | 271 | 18 | Linear | 253 | 0.94 |
| Example 4 | EMULGEN 320P | 2.0 | 1 | Ether | 28 | 830 | 18 | Linear | 253 | 0.30 |
| Example 5 | EXCEPARL MS | 1.5 | <1 | Ester | 33 | 299 | 17 | Linear | 239 | 0.80 |
| Example 6 | 2-Octyldodecanol | 1.5 | <1 | Alcohol | 1 | 299 | 20 | Branched | 281 | 0.94 |
| Example 7 | 1-Octanol | 1.5 | <1 | Alcohol | −16 | 130 | 8 | Linear | 113 | 0.87 |
| Example 8 | None (Note 1) | | | | | | | | | |
| Example 9 | 1-Eicosanol | 0.3 | <1 | Alcohol | 65 | 299 | 20 | Linear | 281 | 0.94 |
| Example 10 | 1-Eicosanol | 0.7 | <1 | Alcohol | 65 | 299 | 20 | Linear | 281 | 0.94 |
| Example 11 | 1-Eicosanol | 1.0 | <1 | Alcohol | 65 | 299 | 20 | Linear | 281 | 0.94 |
| Example 12 | 1-Eicosanol | 2.0 | <1 | Alcohol | 65 | 299 | 20 | Linear | 281 | 0.94 |
| Example 13 | 1-Eicosanol | 5.0 | <1 | Alcohol | 65 | 299 | 20 | Linear | 281 | 0.94 |
| Comparative Example 1 | 1-Hexanol | 1.5 | <1 | Alcohol | −45 | 102 | 6 | Linear | 85 | 0.83 |
| Comparative Example 2 | 1-Butanol | 1.5 | >5 | Alcohol | −90 | 74 | 4 | Linear | 57 | 0.77 |
| Comparative Example 3 | None | | | | | | | | | |
| Example 101 | 1-Eicosanol | 1.5 | <1 | Alcohol | 65 | 299 | 20 | Linear | 281 | 0.94 |
| Example 102 | 1-Eicosanol | 1.5 | <1 | Alcohol | 65 | 299 | 20 | Linear | 281 | 0.94 |
| Example 103 | EMULGEN 320P | 2.0 | 1 | Ether | 28 | 830 | 18 | Linear | 253 | 0.30 |
| Example 104 | EXCEPARL MS | 1.5 | <1 | Ester | 33 | 299 | 17 | Linear | 239 | 0.80 |
| Example 105 | 2-Octyldodecanol | 1.5 | <1 | Alcohol | 1 | 299 | 20 | Branched | 281 | 0.94 |
| Example 106 | 1-Octanol | 1.5 | <1 | Alcohol | −16 | 130 | 8 | Linear | 113 | 0.87 |
| Comparative Example 101 | 1-Hexanol | 1.5 | <1 | Alcohol | −45 | 102 | 6 | Linear | 85 | 0.83 |
| Comparative Example 102 | 1-Butanol | 1.5 | >5 | Alcohol | −90 | 74 | 4 | Linear | 57 | 0.77 |

Total solid content of particles (amounts are described in parts by mass)
Specified hydrophobic compound or comparative compound

| | Content relative to total ink amount (mass %) | | Content relative to total solid content of particles (mass %) | | Pencil hardness | Scratch resistance | Ejection stability |
|---|---|---|---|---|---|---|---|
| | Compound | Alkyl group | Compound | Alkyl group | | | |
| Example 1 | 0.25 | 0.23 | 1.50 | 1.41 | 2H | A | A |
| Example 2 | 0.25 | 0.23 | 1.50 | 1.42 | 2H | A | A |
| Example 3 | 0.25 | 0.23 | 1.50 | 1.40 | 2H | A | A |
| Example 4 | 0.33 | 0.10 | 2.00 | 0.61 | H | A | A |
| Example 5 | 0.25 | 0.20 | 1.50 | 1.20 | H | B | B |
| Example 6 | 0.25 | 0.23 | 1.50 | 1.41 | HB | B | B |

TABLE 1-2-continued

| | | | | | | | |
|---|---|---|---|---|---|---|---|
| Example 7 | 0.25 | 0.21 | 1.50 | 1.30 | HB | B | B |
| Example 8 | | None (Note 1) | | | 2H | A | B |
| Example 9 | 0.05 | 0.05 | 0.30 | 0.28 | H | B | A |
| Example 10 | 0.11 | 0.11 | 0.70 | 0.66 | 2H | A | A |
| Example 11 | 0.16 | 0.15 | 1.00 | 0.94 | 2H | A | A |
| Example 12 | 0.33 | 0.31 | 2.00 | 1.88 | 2H | A | A |
| Example 13 | 0.82 | 0.77 | 5.00 | 4.71 | H | A | B |
| Comparative Example 1 | 0.25 | 0.20 | 1.50 | 1.25 | B | C | C |
| Comparative Example 2 | 0.25 | 0.19 | 1.50 | 1.15 | B | C | C |
| Comparative Example 3 | 0 | 0 | 0 | 0 | B | C | A |
| Example 101 | 0.25 | 0.23 | 1.50 | 1.41 | 2H | A | A |
| Example 102 | 0.25 | 0.23 | 1.50 | 1.41 | 2H | A | A |
| Example 103 | 0.33 | 0.10 | 2.00 | 0.61 | H | A | A |
| Example 104 | 0.25 | 0.20 | 1.50 | 1.20 | H | B | B |
| Example 105 | 0.25 | 0.23 | 1.50 | 1.41 | HB | B | B |
| Example 106 | 0.25 | 0.21 | 1.50 | 1.30 | HB | B | B |
| Comparative Example 101 | 0.25 | 0.20 | 1.50 | 1.25 | B | C | C |
| Comparative Example 102 | 0.25 | 0.19 | 1.50 | 1.15 | B | C | C |

(Note 1) The ink of Example 8 contains, outside of particles, as the specified hydrophobic compound, 1-eicosanol such that its content relative to the total ink amount is 0.25 mass %, and its content relative to the total particle solid content is 1.50 mass %.

In Table 1-2 and Table 2-2, in columns for "Specified hydrophobic compound or comparative compound", "M" means the molecular weight of a specified hydrophobic compound or a comparative compound; in columns for "Alkyl group", "M" means the molecular weight of an alkyl group.

In Table 1-2 and Table 2-2, in columns for "Alkyl group", "C" means the number of carbon atoms of an alkyl group.

As described in Tables 1-1 and 1-2, Examples 1 to 13 and 101 to 106, which employed inks containing a specified hydrophobic compound (specifically, a hydrophobic compound that has an alkyl group having 8 or more carbon atoms and has a molecular weight of 5000 or less), provided images having higher scratch resistance than Comparative Example 3, which employed an ink not containing any specified hydrophobic compound, and Comparative Examples 1, 2, 101, and 102, which employed inks containing not a specified hydrophobic compound but a comparative compound.

Comparison among Examples 1 to 3 and Example 7 has revealed that, when the specified hydrophobic compound has an alkyl group having 16 or more carbon atoms, the image has higher scratch resistance.

Comparison between Example 9 and Example 10 has revealed that, when the specified hydrophobic compound content relative to the total amount of the ink is 0.10 mass % or more, the image has higher scratch resistance and higher hardness.

Comparison between Example 12 and Example 13 has revealed that, when the specified hydrophobic compound content relative to the total amount of the ink is 0.50 mass % or less, higher ink ejection stability is achieved.

Comparison between Example 9 and Example 10 has revealed that, when the alkyl group content of the specified hydrophobic compound relative to the total amount of the ink is 0.08 mass % or more, the image has higher scratch resistance and higher hardness.

Comparison between Example 12 and Example 13 has revealed that, when the alkyl group content of the specified hydrophobic compound relative to the total amount of the ink is 0.40 mass % or less, higher ink ejection stability is achieved.

Comparison between Example 1 and Example 8 has revealed that, when the specified hydrophobic compound is included in the specified particles, higher ink ejection stability is achieved.

Comparison between Example 9 and Example 10 has revealed that, when the specified hydrophobic compound content relative to the total solid-content amount of the specified particles is 0.50 mass % or more, the image has higher scratch resistance and higher hardness.

Comparison between Example 12 and Example 13 has revealed that, when the specified hydrophobic compound content relative to the total solid-content amount of the specified particles is 2.50 mass % or less, higher ink ejection stability is achieved.

Comparison between Example 9 and Example 10 has revealed that, when the alkyl group content of the specified hydrophobic compound relative to the total solid-content amount of the specified particles is 0.40 mass % or more, the image has higher scratch resistance and higher hardness.

Comparison between Example 12 and Example 13 has revealed that, when the alkyl group content of the specified hydrophobic compound relative to the total solid-content amount of the specified particles is 2.00 mass % or less, higher ink ejection stability is achieved.

Comparison between Example 1 and Example 6 has revealed that, when the specified hydrophobic compound has a melting point of more than 25° C., the image has higher scratch resistance and higher hardness.

Comparison between Example 1 and Example 6 has revealed that, when the alkyl group of the specified hydrophobic compound is a linear alkyl group, the image has higher scratch resistance and higher hardness.

Comparison among Example 3 and Examples 4 and 5 has revealed that, when the specified hydrophobic compound is an alcohol, the image has higher hardness.

Example 201

Preparation of Aqueous Dispersion of Microcapsules (MC)

In the following manner, an aqueous dispersion of microcapsules (MC) was prepared that included a shell composed of a polymer having a urethane bond and a urea bond, and a core including polymerizable compounds, a photopolymerization initiator, a sensitizer, and a specified hydrophobic compound.

Preparation of Oil-Phase Component

Ethyl Acetate,

TAKENATE (registered trademark) D-110N (43 parts by mass as the amount of a trifunctional isocyanate compound present as solid content; hereafter, this solid content is also referred to as "D110") manufactured by Mitsui Chemicals, Inc., a solution of the following NCO1 (10 parts by mass as the amount of NCO1 present as solid content), the above-described S833 as a polymerizable compound (20.5 parts by mass), the above-described S399 as a polymerizable compound (22 parts by mass), the above-described IRG819 as a photopolymerization initiator (2.5 parts by mass), the above-described ITX as a sensitizer (0.5 parts by mass), and 1-eicosanol as a specified hydrophobic compound (1.5 parts by mass)

were mixed and stirred for 15 minutes, to obtain 45.7 g of an oil-phase component having a solid content of 30 mass %.

TAKENATE D-110N is a 75 mass % ethyl acetate solution of an adduct of trimethylolpropane (TMP) and m-xylylene diisocyanate (XDI) ("D110", which is a trifunctional isocyanate compound).

NCO1 is an isocyanate compound having an introduced carboxy group, specifically, an adduct of 2,2-bis(hydroxymethyl) propionate (DMPA) and IPDI (DMPA/IPDI=⅓ (molar ratio)).

The above-described NCO1 solution is a 35 mass % ethyl acetate solution of NCO1.

The NCO1 solution was prepared in the following manner: to a three-neck flask, 45 g of 2,2-bis(hydroxymethyl) propionate (DMPA), 223.72 g of isophorone diisocyanate (IPDI), 499.05 g of ethyl acetate (AcOEt) were added, and heated at 50° C.; to this, 0.7677 g of NEOSTANN U-600 was added, and a reaction was caused for 3 hours.

Preparation of Aqueous-Phase Component

Distilled water (43.1 g) and sodium hydroxide serving as a neutralizer were mixed and stirred for 15 minutes, to prepare an aqueous-phase component.

The amount of sodium hydroxide used as a neutralizer was adjusted such that the MC to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(Polymer 1 content relative to total solid-content amount of oil-phase component (mass %)/100)×Acid value of Polymer 1 (mmol/g)×0.9×Molecular weight of sodium hydroxide (g/mol)/1000

The oil-phase component and the aqueous-phase component were mixed, and the resultant mixture was emulsified at room temperature with a homogenizer at 12000 rpm for 10 minutes, to obtain an emulsion. The obtained emulsion was added to distilled water (15.3 g). The resultant liquid was heated at 50° C., and stirred at 50° C. for 5 hours, to drive off ethyl acetate from the liquid.

The liquid from which ethyl acetate had been driven off was diluted with distilled water such that the solid-content amount became 20 mass %, to thereby obtain an aqueous dispersion of microcapsules.

The polymer of the shells of the microcapsules is formed by a reaction between D110, which is a trifunctional isocyanate compound, and NCO1, which is an isocyanate compound having an introduced carboxy group, and has a three-dimensional crosslinked structure.

The polymer of the shells of the microcapsules has
urethane bonds originally included in NCO1,
urethane bonds originally included in D110, and
urea bonds formed by reactions of isocyanate groups in D110 or NCO1, isocyanate groups in D110 or NCO1, and water.

Preparation of Ink

Components were mixed together so as to satisfy the following composition to prepare an ink.

Composition of Ink

The above-described aqueous dispersion: 82 parts

Pigment dispersion liquid (Pro-jet Cyan APD1000 (manufactured by FUJIFILM Imaging Colorants, Inc.), pigment concentration: 14 mass %): 13 parts Fluorosurfactant (manufactured by E. I. du Pont de Nemours and Company, Capstone FS-31, solid content: 25 mass %): 0.3 parts 2-Methylpropanediol: 4.7 parts Evaluations The obtained ink was used for evaluations the same as the evaluations in Example 1. The results are described in Table 2-2.

Examples 202 to 204 and 206

The same procedures as in Example 201 were performed except that the species of the specified hydrophobic compound, the amount of the specified hydrophobic compound, and the combination of the amounts of polymerizable compounds were changed as described in Tables 2-1 and 2-2.

The results are described in Table 2-2.

Example 205

In Example 205, Polymer 1 used in Example 1 is used as a dispersing agent for microcapsules.

The same procedures as in Example 201 were performed except that, in the Preparation of oil-phase component, the solution of NCO1 (10 parts by mass as the amount of NCO1 present as solid content) was changed to the 30 mass % solution of Polymer 1 prepared in Example 1 (10 parts by mass as the amount of Polymer 1 present as solid content).

The results are described in Table 2-2.

The polymer of the shells of microcapsules in Example 205 has urea bonds formed by reactions between an isocyanate group of D110 and water.

Comparative Example 201

The same procedures as in Example 201 were performed except that the specified hydrophobic compound was changed to a comparative compound (1-butanol) described in Table 2-2.

The results are described in Table 2-2.

Comparative Example 202

The same procedures as in Example 201 were performed except that, in the Preparation of aqueous dispersion, the specified hydrophobic compound was not used.

The results are described in Table 2-2.

Example 301

Preparation of Aqueous Dispersion, Preparation of Ink, and Evaluations

The same procedures as in Example 1 were performed except that S833, S399, IRG819, and ITX were changed to "B7982" (45.5 parts by mass) as a thermal-polymerizable monomer, and in the evaluations of hardness of a cured film and scratch resistance of a cured film, the procedures of heating the coating film at 60° C. for 3 minutes to dry the coating film, and irradiating the dried coating film with ultraviolet radiation (UV) were changed to a procedure of heating the coating film in an oven at 120° C. for 5 minutes.

The results are described in Table 2-2.

Example 302

The same procedures as in Example 301 were performed except that B7982 was changed to "E840" (41.5 parts by mass) serving as a thermal-polymerizable oligomer having an epoxy group, and "2MI" (4 parts by mass) serving as a thermal curing accelerator. The results are described in Table 2-2.

Examples 303 and 304

The same procedures as in Example 301 were performed except that the species of the specified hydrophobic compound, the amount of the specified hydrophobic compound, and the combination of the amounts of polymerizable compounds were changed as described in Tables 2-1 and 2-2.

The results are described in Table 2-2.

Comparative Example 301

The same procedures as in Example 301 were performed except that the specified hydrophobic compound was changed to a comparative compound (1-butanol) described in Table 2-2.

The results are described in Table 2-2.

In each of the above-described Examples 201 to 206 and 301 to 304 and Comparative Examples 201, 202, and 301, the aqueous dispersion of the specified particles was used for measurement of the volume-average dispersed-particle size of the specified particles.

As a result, in each of the Examples, the specified particles were found to have a volume-average dispersed-particle size in a range of 0.15 μm to 0.25 μm.

In each of the above-described Examples 201 to 206 and 301 to 304, the aqueous dispersion of the specified particles was used for measurement of the enclosure ratio of the hydrophobic compound in the specified particles.

As a result, in each of Examples 201 to 206 and 301 to 304, the specified particles were found to have an enclosure ratio of 99 mass % or more, which demonstrated that the specified particles included the specified hydrophobic compound.

TABLE 2-1

Total solid content of specified particles (amounts are described in parts by mass)

| | Shells of MC (starting materials) | | Cores of MC | | | | | | | |
|---|---|---|---|---|---|---|---|---|---|---|
| | | | Polymerizable compound | | Polymerizable compound | | Photopolymerization initiator or thermal curing accelerator | | Sensitizer | |
| | Species | Amount | Species | Amount | Species | Amount | Species | Amount | Species | Amount |
| Example 201 | D110 | 43 | NCO1 | 10 | S833 | 20.5 | S399 | 22 | IRG819 | 2.5 | ITX | 0.5 |
| Example 202 | D110 | 43 | NCO1 | 10 | S833 | 20.5 | S399 | 22 | IRG819 | 2.5 | ITX | 0.5 |
| Example 203 | D110 | 43 | NCO1 | 10 | S833 | 20.0 | S399 | 22 | IRG819 | 2.5 | ITX | 0.5 |
| Example 204 | D110 | 43 | NCO1 | 10 | S833 | 20.5 | S399 | 22 | IRG819 | 2.5 | ITX | 0.5 |
| Example 205 | D110 | 43 | — | — | S833 | 20.5 | S399 | 22 | IRG819 | 2.5 | ITX | 0.5 |
| Example 206 | D110 | 43 | NCO1 | 10 | S833 | 20.5 | S399 | 22 | IRG819 | 2.5 | ITX | 0.5 |
| Comparative Example 201 | D110 | 43 | NCO1 | 10 | S833 | 20.5 | S399 | 22 | IRG819 | 2.5 | ITX | 0.5 |
| Comparative Example 202 | D110 | 43 | NCO1 | 10 | S833 | 22.0 | S399 | 22 | IRG819 | 2.5 | ITX | 0.5 |
| Example 301 | D110 | 43 | NCO1 | 10 | B7982 | 45.5 | — | — | — | — | — | — |
| Example 302 | D110 | 43 | NCO1 | 10 | E840 | 41.5 | — | — | 2MI | 4 | — | — |
| Example 303 | D110 | 43 | NCO1 | 10 | B7982 | 45.0 | — | — | — | — | — | — |
| Example 304 | D110 | 43 | NCO1 | 10 | B7982 | 45.5 | — | — | — | — | — | — |
| Comparative Example 301 | D110 | 43 | NCO1 | 10 | B7982 | 45.5 | — | — | — | — | — | — |

TABLE 2-2

Total solid content of specified particles (amounts are described in parts by mass)

Cores of MC
Specified hydrophobic compound or comparative compound

| | Species | Amount | Classification | Melting point (° C.) | M | C | Alkyl group Classification | M | Content | Content relative to total ink amount (mass %) | Dispersing agent Species |
|---|---|---|---|---|---|---|---|---|---|---|---|
| Example 201 | 1-Eicosanol | 1.5 | Alcohol | 65 | 299 | 20 | Linear | 281 | 0.94 | 0.25 | — |
| Example 202 | 1-Docosanol | 1.5 | Alcohol | 70 | 327 | 22 | Linear | 309 | 0.95 | 0.25 | — |
| Example 203 | EMULGEN 320P | 2.0 | Ether | 28 | 830 | 18 | Linear | 253 | 0.30 | 0.33 | — |
| Example 204 | EXCEPARL MS | 1.5 | Ester | 33 | 299 | 17 | Linear | 239 | 0.80 | 0.25 | — |
| Example 205 | 1-Eicosanol | 1.5 | Alcohol | 65 | 299 | 20 | Linear | 281 | 0.94 | 0.25 | Polymer 1 |
| Example 206 | 2-Octyldodecanol | 1.5 | Alcohol | 1 | 299 | 20 | Branched | 281 | 0.94 | 0.25 | — |
| Comparative Example 201 | 1-Butanol | 1.5 | Alcohol | −90 | 74 | 4 | Linear | 57 | 0.77 | 0.25 | — |
| Comparative Example 202 | None | | | | | | | | | 0 | — |
| Example 301 | 1-Eicosanol | 1.5 | Alcohol | 65 | 299 | 20 | Linear | 281 | 0.94 | 0.25 | — |
| Example 302 | 1-Eicosanol | 1.5 | Alcohol | 65 | 299 | 20 | Linear | 281 | 0.94 | 0.25 | — |
| Example 303 | EMULGEN 320P | 2.0 | Ether | 28 | 830 | 18 | Linear | 253 | 0.30 | 0.33 | — |
| Example 304 | EXCEPARL MS | 1.5 | Ester | 33 | 299 | 17 | Linear | 239 | 0.80 | 0.25 | — |
| Comparative Example 301 | 1-Butanol | 1.5 | Alcohol | −90 | 74 | 4 | Linear | 57 | 0.77 | 0.25 | — |

Total solid content of specified particles (amounts are described in parts by mass)

| | Dispersing agent Amount | Pencil hardness | Scratch resistance | Ejection stability |
|---|---|---|---|---|
| Example 201 | — | 2H | A | A |
| Example 202 | — | 2H | A | A |
| Example 203 | — | H | A | A |
| Example 204 | — | H | B | B |
| Example 205 | 10 | 2H | A | A |
| Example 206 | — | HB | B | B |
| Comparative Example 201 | — | B | C | C |
| Comparative Example 202 | — | B | C | A |
| Example 301 | — | 2H | A | A |
| Example 302 | — | 2H | A | A |
| Example 303 | — | H | A | A |
| Example 304 | — | H | B | B |
| Comparative Example 301 | — | B | C | C |

As described in Tables 2-1 and 2-2, Examples 201 to 206 and 301 to 304, which employed inks containing a specified hydrophobic compound (specifically, a hydrophobic compound that has an alkyl group having 8 or more carbon atoms and has a molecular weight of 5000 or less), provided images having higher scratch resistance than Comparative Example 202, which employed an ink not containing any specified hydrophobic compound and Comparative Examples 201 and 301, which employed inks containing not a specified hydrophobic compound but a comparative compound.

The entire contents disclosed by JP2017-074057 filed in the Japan Patent Office on Apr. 3, 2017 are incorporated herein by reference.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink composition comprising:
   water;
   particles that include a polymer having at least one of a urethane bond or a urea bond, and have a polymerizable group; and
   a hydrophobic compound that has an alkyl group having 8 or more carbon atoms and has a molecular weight of 5000 or less,
   wherein a content of the hydrophobic compound relative to a total amount of the ink composition is from 0.05 mass % to 0.90 mass %.

2. The ink composition according to claim 1, wherein the hydrophobic compound has the alkyl group that has 16 or more carbon atoms.

3. The ink composition according to claim 1, wherein the content of the hydrophobic compound relative to the total amount of the ink composition is 0.10 mass % to 0.50 mass %.

4. The ink composition according to claim 1, wherein a content of the alkyl group of the hydrophobic compound relative to the total amount of the ink composition is 0.08 mass % to 0.40 mass %.

5. The ink composition according to claim 1, wherein the hydrophobic compound is included in the particles.

6. The ink composition according to claim 1, wherein a content of the hydrophobic compound relative to a total solid-content amount of the particles is 0.50 mass % to 2.50 mass %.

7. The ink composition according to claim 1, wherein a content of the alkyl group of the hydrophobic compound relative to a total solid-content amount of the particles is 0.40 mass % to 2.00 mass %.

8. The ink composition according to claim 1, wherein the hydrophobic compound has a melting point of more than 25° C.

9. The ink composition according to claim 1, wherein the alkyl group of the hydrophobic compound is a linear alkyl group.

10. The ink composition according to claim 1, wherein the hydrophobic compound is an alcohol.

11. A method for producing the ink composition according to claim 1,
the method comprising mixing and emulsifying (A) an oil-phase component including an organic solvent, the hydrophobic compound, the polymer, and a polymerizable compound, or an oil-phase component including an organic solvent, the hydrophobic compound, a tri- or higher functional isocyanate compound, and a polymerizable compound, and (B) an aqueous-phase component including water, to form the particles.

12. An image-forming method comprising:
applying the ink composition according to claim 1 onto a substrate; and
curing the ink composition applied onto the substrate.

* * * * *